(12) United States Patent
Lee et al.

(10) Patent No.: US 9,207,431 B2
(45) Date of Patent: Dec. 8, 2015

(54) IMAGING LENS SYSTEM AND ELECTRONIC APPARATUS EMPLOYING THE SAME

(71) Applicant: SAMSUNG ELECTRONICS CO., LTD., Suwon-si, Gyeonggi-do (KR)

(72) Inventors: Tae-youn Lee, Yongin-si (KR); Jung-pa Seo, Suwon-si (KR); Yong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/269,351

(22) Filed: May 5, 2014

(65) Prior Publication Data

US 2015/0138425 A1 May 21, 2015

(30) Foreign Application Priority Data

Nov. 21, 2013 (KR) ........................ 10-2013-0142377

(51) Int. Cl.
*G02B 11/32* (2006.01)
*G02B 13/00* (2006.01)
*G02B 9/62* (2006.01)

(52) U.S. Cl.
CPC .............. *G02B 13/0015* (2013.01); *G02B 9/62* (2013.01); *G02B 13/0045* (2013.01)

(58) Field of Classification Search
CPC .. G02B 13/0015; G02B 9/62; G02B 13/0045; G02B 15/22
See application file for complete search history.

(56) References Cited

U.S. PATENT DOCUMENTS

| 7,502,181 | B2 | 3/2009 | Shinohara |
| 8,035,723 | B2 | 10/2011 | Sano et al. |
| 2012/0188654 | A1 | 7/2012 | Huang |
| 2013/0342918 | A1* | 12/2013 | Kubota et al. ................. 359/713 |

FOREIGN PATENT DOCUMENTS

| JP | 2009-294527 A | 12/2009 |
| JP | 2009-294528 A | 12/2009 |
| JP | 2012-155223 A | 8/2012 |
| KR | 10-2007-0097369 A | 10/2007 |
| KR | 10-2010-0001525 A | 1/2010 |
| KR | 10-2010-0040357 A | 4/2010 |
| KR | 10-2010-0043667 A | 4/2010 |
| KR | 10-2011-0024872 A | 3/2011 |

* cited by examiner

*Primary Examiner* — Joseph P Martinez
(74) *Attorney, Agent, or Firm* — Drinker Biddle & Reath LLP

(57) ABSTRACT

An imaging lens system includes a first lens that includes a convex object-side surface and has a positive refractive power; a second lens that includes a concave image plane-side surface and has a negative refractive power; a third lens; a fourth lens that includes two spherical surfaces and has a negative refractive power; a fifth lens that includes a convex image plane-side surface and has a positive refractive power; and a sixth lens that has a negative refractive power, wherein the first through sixth lenses are arranged in order from an object side to an image plane side.

21 Claims, 17 Drawing Sheets

IMAGING LENS SYSTEM AND ELECTRONIC APPARATUS EMPLOYING THE SAME

RELATED APPLICATION

This application claims the priority benefit of Korean Patent Application No. 10-2013-0142377, filed on Nov. 21, 2013, in the Korean Intellectual Property Office, the disclosure of which is incorporated herein in its entirety by reference.

BACKGROUND

1. Field

One or more embodiments relate to a bright and large aperture imaging lens system and an electronic apparatus employing the same.

2. Related Art

Recently, electronic apparatuses such as digital cameras or video cameras that have solid-state imaging devices such as a charge coupled device (CCD) or a complementary metal-oxide semiconductor (CMOS) have been widely distributed.

Since electronic apparatuses using the solid-state imaging devices are appropriate for miniaturization, in recent years, the electronic apparatuses have been applied to small information terminals such as cellular phones. Also, as consumer professionalism with respect to cameras has been continuously increasing, there is increasing demand for a design that realizes optical performance suitable for various uses together with miniaturization.

Recently, a high pixel camera module of 10.3 million pixels, which is equipped with an imaging lens formed as a five piece lens and a CMOS sensor having a size of ⅓" has been developed and produced as a mobile phone camera. The camera module using this small sensor generally has a short focal length and a high F-number, and thus, a depth of field is great so that an effect whereby a background is blurred, such as out-focusing, is not realized well. However, consumer demand for a function like out-focusing has been increasing in a field of the mobile phone cameras. For this, a comparatively large sensor having a diagonal length which is within a range of 1/1.83" to 1," may be used, and thus, a configuration of an optical system that is appropriate for this large sensor is required.

SUMMARY

One or more embodiments include a bright and large aperture imaging lens system capable of appropriate aberration correction.

Additional aspects will be set forth in part in the description which follows and, in part, will be apparent from the description, or may be learned by practice of the presented embodiments.

According to one or more embodiments, an imaging lens system includes: a first lens that includes a convex object-side surface and has a positive refractive power; a second lens that includes a concave image plane-side surface and has a negative refractive power; a third lens; a fourth lens that includes two spherical surfaces and has a negative refractive power; a fifth lens that includes a convex image plane-side surface and has a positive refractive power; and a sixth lens that has a negative refractive power, wherein the first through sixth lenses are arranged in order from an object side to an image plane side.

The fifth lens may have at least one spherical surface.

The imaging lens system may satisfy the following conditions, $$20 < V1-V2 < 45, \text{ and}$$

$$20 < V1-V4 < 45,$$

wherein V1, V2, and V4 are Abbe numbers of the first lens, the second lens, and the fourth lens, respectively.

The imaging lens system may satisfy the following condition, $$1.5 \leq f/EPD \leq 2.4,$$

wherein f is a focal length of the imaging lens system and EPD is an entrance pupil diameter of the imaging lens system.

The imaging lens system may satisfy the following condition, $$0.7 < f/f1 < 1.9,$$

wherein f is a focal length of the imaging lens system and f1 is a focal length of the first lens.

The imaging lens system may satisfy the following condition, $$0.9 < TL/f < 2.0,$$

wherein f is a focal length of the imaging lens system and TL is a distance from a vertex of the object-side surface of the first lens to the image plane.

The imaging lens system may satisfy the following condition, $$1.0 < f/f5 < 3.0,$$

wherein f is a focal length of the imaging lens system and f5 is a focal length of the fifth lens.

An image plane-side surface of the sixth lens may be an aspherical surface that is concave near an optical axis and have at least one inflection point.

The imaging lens system may satisfy the following conditions, $$1.58 < N2 < 1.68,$$

$$1.58 < N4 < 1.68,$$

$$1.51 < N5 < 1.56, \text{ and}$$

$$1.51 < N6 < 1.56,$$

wherein N2, N4, N5, and N6 are refractive indexes of the second lens, the fourth lens, the fifth lens, and the sixth lens, respectively, measured at a d-line wavelength.

The imaging lens system may satisfy the following condition, $$Yimg/\text{Tan } \omega > 5.5 \text{ mm},$$

wherein Yimg is a maximum image height on the image plane and $\omega$ is a half angle of view.

A stop may be disposed on the object side of the first lens or between the first lens and the second lens.

At least one of the first lens, the second lens, the third lens, the fourth lens, the fifth lens, and the sixth lens may move along an optical axis to perform focusing.

The at least one of the first lens, the second lens, the third lens, the fourth lens, the fifth lens, and the sixth lens, which is relatively located on the object side, may form a focusing lens group, and when performing focusing, the focusing lens group may move along the optical axis and the remaining lenses may be fixed.

The focusing lens group may be formed of the first lens, the second lens, and the third lens.

The focusing lens group may be formed of the first lens, the second lens, the third lens, and the fourth lens.

The first through sixth lenses may be divided into a front group formed of at least one lens that is relatively located on the object side and a rear group formed of the remaining lenses that are relatively located on the image plane side. In a photographing mode, the front group and the rear group may be arranged along a common optical axis, and in a non-photographing mode, the rear group may be arranged by moving in a direction perpendicular to the optical axis, and the front group may be arranged by moving toward the image plane side along the optical axis.

The front group may be formed of the first lens, the second lens, and the third lens, and the rear group may be formed of the fourth lens, the fifth lens, and the sixth lens.

The front group may be formed of the first lens, the second lens, the third lens, and the fourth lens, and the rear group may be formed of the fifth lens and the sixth lens.

According to one or more embodiments, an electronic apparatus includes: the imaging lens system described above; and an image sensor that converts an optical image formed by the imaging lens system into an electrical signal.

At least one lens selected from the group consisting of the first lens, the second lens, the third lens, the fourth lens, the fifth lens, and the sixth lens of the electronic apparatus may move along an optical axis to perform focusing.

The first through sixth lenses of the imaging lens system of the electronic apparatus may be divided into a front group formed of at least one lens that is relatively located on the object side and a rear group formed of the remaining lenses that are relatively located on the image plane side, wherein, in a photographing mode, the front group and the rear group are arranged along a common optical axis, and in a non-photographing mode, the rear group may be arranged by moving in a direction perpendicular to the optical axis, and the front group may be arranged by moving toward the image plane side along the optical axis.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
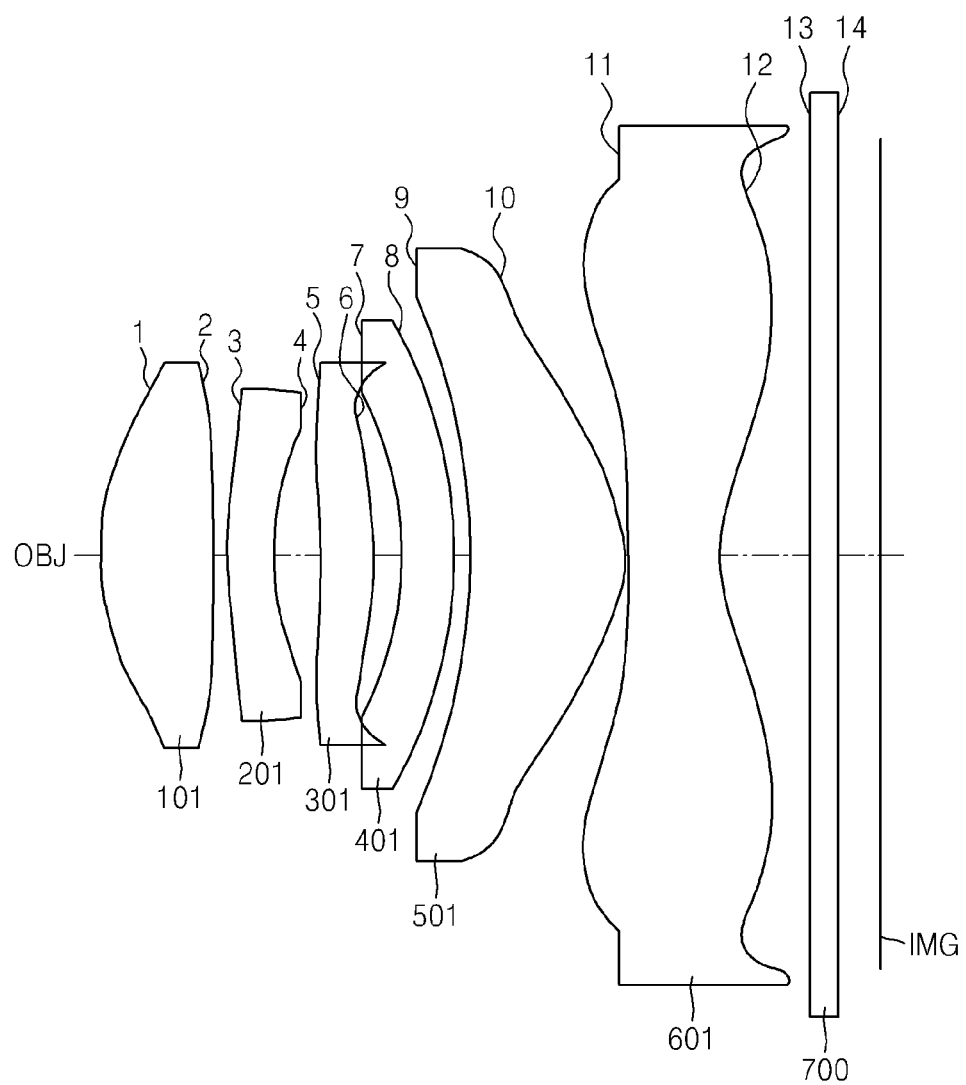
FIG. 1 is a cross-sectional view illustrating an optical arrangement of an imaging lens system according to a first embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIGS. 1, 4, 7, 10, and 14 are cross-sectional views respectively illustrating optical arrangements of imaging lens systems according to first through fifth embodiments.

The imaging lens systems according to the first through fifth embodiments have a shape of lens and power arrangement that enable correction of aberration which may occur when a large sensor is applied and enable achievement of a bright lens. The imaging lens systems include six pieces of lenses and may appropriately configure a surface shape of each of the six pieces of lenses to effectively correct axial spherical aberration and off-axial coma aberration that are increased in realizing the bright lens.

Referring to the drawings, + the imaging lens systems include a first lens 101 through 105, a second lens 201 through 205, a third lens 301 through 305, a fourth lens 401 through 405, a fifth lens 501 through 505, and a sixth lens 601 through 605 that are arranged in order from an object OBJ side to an image plane IMG side.

The first lens 101 through 105 may have a positive refractive power and an object OBJ side surface that is convex. The second lens 201 through 205 may have a negative refractive power and an image plane IMG-side surface that is concave. The third lens 301 through 305 may have a positive or negative refractive power. The fourth lens 401 through 405 may have a negative refractive power and be a spherical lens of which both surfaces are spherical. The fifth lens 501 through 505 may have a positive refractive power and an image plane IMG-side surface that is convex. The sixth lens 601 through 605 may have a negative refractive power.

A stop may be disposed on the object OBJ side of the first lens 101 through 105, or between the first lens 101 through 105 and the second lens 201 through 205. A filter 700 may be disposed between the sixth lens 601 through 605 and the image plane IMG. The filter 700 may be an infrared (IR) cut-off filter. A cover glass may further be disposed between the sixth lens 601 through 605 and the image plane IMG. An image sensor (not shown), such as a charge coupled device (CCD) or a complementary metal-oxide semiconductor (CMOS), is laid on the image plane IMG.

The third lens 301 through 305 may have two aspherical surfaces for effective correction of coma aberration. The fourth lens 401 through 405 may have a high-dispersive material for correction of chromatic aberration due to a large aperture, and may have two surfaces that are spherical for reduction of sensitivity to decentering. The fifth lens 501 through 505 may have at least one spherical surface and a convex image plane IMG-side surface to effectively correct aberration and obtain telecentric properties. The sixth lens 601 through 605 has a negative refractive power, enabling a back focal length to be obtained. The sixth lens 601 through 605 may be an aspherical lens having an image plane IMG-side surface that is concave near an optical axis and having at least one inflection point. The sixth lens 601 through 605 may be formed such that the image plane IMG-side surface is concave near the optical axis and convex toward the image plane IMG away from the optical axis so that residual astigmatic field curves and distortion of the first lens 101 through 105 through the fifth lens 501 through 505 may be corrected and color shading may be prevented by adjusting an angle at which a chief ray is incident on the image plane IMG.

The imaging lens system may satisfy the following conditions.

$$20 < V1\text{-}V2 < 45, \text{ and} \tag{1}$$

$$20 < V1\text{-}V4 < 45, \tag{2}$$

Here, "V1", "V2", and "V4" are Abbe numbers of the first lens 101 through 105, the second lens 201 through 205, and the fourth lens 401 through 405, respectively.

The above conditions are for appropriately correcting overall chromatic aberration of the optical system, that is, axial longitudinal chromatic aberration and off-axial chromatic aberration of magnification. Since the chromatic aberration, in particular, the axial longitudinal chromatic aberration, is increased in proportion to a focal length that is increased when a large sensor is applied, a high-dispersive material is used in the second lens 201 through 205 and the fourth lens 401 through 405 that have negative refractive powers, in order to reduce the increased chromatic aberration. Within the above ranges, chromatic aberration may be more easily corrected as V1-V2 and V1-V4 get closer to a lower limit, and a costly advantageous material may be selected as V1-V2 and V1-V4 get closer to an upper limit.

The imaging lens system may satisfy the following condition.

$$1.5 \le f/EPD \le 2.4 \tag{3}$$

Here, "f" is a focal length of the imaging lens system, and "EPD" is an entrance pupil diameter of the imaging lens system. That is, the conditional expression defines an F-number of the imaging lens system.

The imaging lens system may satisfy the following condition.

$$0.7 < f/f1 < 1.9 \tag{4}$$

Here, "f" is a focal length of the imaging lens system, and "f1" is a focal length of the first lens.

The condition 4 defines a refractive power of the first lens 101 through 105. Outside a range of a lower limit of the condition, the refractive power of the first lens 101 through 105 is reduced so that overall longitudinal chromatic aberration of the optical system is increased. Outside the range of the upper limit of the condition, the refractive power of the first lens 101 through 105 is excessively increased so that spherical aberration is increased and it may be difficult to correct aberration.

The imaging lens system may satisfy the following condition.

$$0.9 < TL/f < 2.0 \tag{5}$$

Here, "f" is a focal length of the imaging lens system, and "TL" is a distance from the vertex of the object OBJ side surface of the first lens to the image plane IMG.

Outside a range of an upper limit of the condition, although it may be easier to correct axial and off-axial aberrations, miniaturization of the imaging lens system may be difficult due to an increase in an optical total length. Outside a range of a lower limit of the conditional expression, miniaturization of the imaging lens system may be easier, but a lens thickness may be reduced so that it may be difficult to form lenses and sensitivity is increased, thereby leading to a reduced productivity.

The imaging lens system may satisfy the following condition.

$$1.0 < f/f5 < 3.0 \tag{6}$$

Here, "f" is a focal length of the imaging lens system, and "f5" is a focal length of the fifth lens.

The condition 6 is for appropriately configuring the focal length of the fifth lens 501 through 505 having a positive refractive power. Outside a range of a lower limit, the refractive power of the fifth lens 501 through 505 is excessively reduced, and thus, it may be difficult to correct astigmatic field curves and distortion. Outside a range of an upper limit, the refractive power of the fifth lens 501 through 505 is excessively increased, and thus, an angle at which light is emitted from an image plane IMG-side surface of the fifth lens 501 through 505 is reduced so that an angle at which light is incident on the image sensor is excessively increased and spherical aberration and astigmatic field curves are excessively increased.

The imaging lens system may satisfy the following conditions.

$$1.58 < N2 < 1.68 \tag{7}$$

$$1.58 < N4 < 1.68 \tag{8}$$

$$1.51 < N5 < 1.56, \text{ and} \tag{9}$$

$$1.51 < N6 < 1.56 \tag{10}$$

Here, "N2", "N4", "N5", and "N6" are refractive powers of the second lens 201 through 205, the fourth lens 401 through 405, the fifth lens 501 through 505, and the sixth lens 601 through 605, respectively, measured at a d-line wavelength.

The conditions 7 through 10 are in consideration of costs of manufacturing, reduction of weight, and availability of lens manufacturing. A plastic material satisfying the conditional expressions may be used in the second lens 201 through 205, the fourth lens 401 through 405, the fifth lens 501 through 505, and the sixth lens 601 through 605.

The imaging lens system may satisfy the following condition.

$$Yimg/\text{Tan } \omega > 5.5 \text{ mm} \qquad (11)$$

Here, "Yimg" is a maximum image height on the image plane IMG and "ω" is a half angle of view.

The condition defines a rate of the maximum image height with respect to the half angle of view. Within a range satisfying the condition, a large sensor having a size of about 1/1.7", which is greater than a small sensor having a size of about 1/4" to about 1/3", may be employed to achieve a high quality image and realize an effect like out-focusing (an effect whereby a background is blurred) that may be difficult to realize using a small sensor.

Also, the imaging lens system may be formed such that at least one of the first lens 101 through 105, the second lens 201 through 205, the third lens 301 through 305, the fourth lens 401 through 405, the fifth lens 501 through 505, and the sixth lens 601 through 605 moves along an optical axis to perform focusing. For example, when performing auto-focusing to a nearest distance from an infinite object distance, the entirety of the first lens 101 through 105, the second lens 201 through 205, the third lens 301 through 305, the fourth lens 401 through 405, the fifth lens 501 through 505, and the sixth lens 601 through 605 may move together along the optical axis. Alternatively, a part of the first lens 101 through 105 to sixth lens 601 through 605, that is, at least one of the first lens 101 through 105 to sixth lens 601 through 605 may move along the optical axis. In this case, the at least one of the first lens 101 through 105 to sixth lens 601 through 605, which is relatively located on the object OBJ side, forms a focusing lens group. When focusing is performed, the focusing lens group may move along the optical axis and the rest of the lenses may be fixed. The more detailed configuration will be described with reference to the fourth and fifth embodiments.

In addition, the imaging lens system may have a retractable configuration so that a storage size may be minimized. The more detailed configuration will be described with reference to the fourth and fifth embodiments.

Hereinafter, the more detailed configurations according to embodiments will be described with respect to lens data. In the lens data, "ST" denotes a stop, and the mark * after surface numbers denotes that the surfaces are aspherical. "f" denotes an overall focal length, "F#" denotes an F-number, and "ω" denotes a half angle of view. The units of a focal length, an optical total length, a radius of curvature, a thickness, and a size are millimeters (mm).

An aspherical surface is defined as follows.

$$Z = \frac{cY^2}{1 + \sqrt{1 - (1+K)c^2Y^2}} + AY^4 + BY^6 + CY^8 + DY^{10} + EY^{12} + FY^{14} + \ldots \qquad (12)$$

In the above equation, "Z" denotes a distance from the vertex of a lens in a direction along an optical axis, "Y" denotes a distance in a direction perpendicular to the optical axis, "K" denotes a conic constant, "A", "B", "C", "D", "E", and "F" each denotes an aspherical surface coefficient, and "c" denotes a reciprocal number (=1/R) of a radius of curvature.

First Embodiment

FIG. 1 is a cross-sectional view illustrating the optical arrangement of the imaging lens system according to the first embodiment.

The imaging lens system includes the first lens 101 having a positive refractive power, the second lens 201 having a negative refractive power, the third lens 301 having a positive refractive power, the fourth lens 401 having a negative refractive power, the fifth lens 501 having a positive refractive power, and the sixth lens 601 having a negative refractive power that are arranged in order from the object OBJ side. A stop (not shown) is disposed on the image plane IMG-side surface of the first lens 101.

Lens data of the first embodiment is as follows.

TABLE 1

|  | Radius of curvature (R) | Thickness or interval | Refractive index (nd) | Abbe number (vd) |
|---|---|---|---|---|
| OBJ | Infinity | infinity |  |  |
| 1* | 3.048 | 1.229 | 1.544 | 56.09 |
| 2(ST)* | −47.254 | 0.156 |  |  |
| 3* | 5.723 | 0.505 | 1.643 | 22.4 |
| 4* | 2.863 | 0.494 |  |  |
| 5* | −100 | 0.59 | 1.544 | 56.09 |
| 6* | −5.666 | 0.308 |  |  |
| 7 | −3.961 | 0.55 | 1.636 | 23.9 |
| 8 | −5.618 | 0.199 |  |  |
| 9 | −7.221 | 1.665 | 1.544 | 56.09 |
| 10* | −1.615 | 0.05 |  |  |
| 11* | −172.506 | 1.001 | 1.544 | 56.09 |
| 12* | 1.563 | 1 |  |  |
| 13 | infinity | 0.3 | 1.517 | 64.2 |
| 14 | infinity | 0.456 |  |  |
| IMG | infinity | 0 |  |  |

TABLE 2

| Surface | K | A | B | C | D | E | F |
|---|---|---|---|---|---|---|---|
| 1 | −7.91E−02 | −1.60E−04 | −5.18E−04 | 3.34E−04 | −1.32E−04 |  |  |
| 2 | −9.90E+01 | −8.70E−03 | 6.14E−03 | −1.85E−03 | −1.44E−04 | 6.65E−05 |  |
| 3 | −8.80E+00 | −2.75E−02 | 1.68E−02 | −5.55E−03 | 3.51E−04 | 1.01E−04 |  |
| 4 | 0.00E+00 | −3.43E−02 | 1.60E−02 | −5.52E−03 | 7.17E−04 |  |  |
| 5 | 9.90E+01 | −1.33E−02 | 3.12E−03 | 1.46E−03 | −3.14E−04 |  |  |
| 6 | −4.11E−01 | −7.45E−03 | 4.41E−03 | −1.23E−04 | 2.37E−04 |  |  |
| 10 | −4.73E+00 | −1.63E−02 | 3.79E−03 | −6.67E−04 | 8.14E−05 | −3.81E−06 |  |
| 11 | −9.90E+01 | −1.80E−02 | 1.38E−03 | 4.70E−05 | −5.26E−06 | −4.50E−08 | 7.44E−09 |
| 12 | −6.35E+00 | −1.18E−02 | 1.38E−03 | −1.38E−04 | 9.07E−06 | −3.74E−07 | 7.36E−09 |

Figure 2:
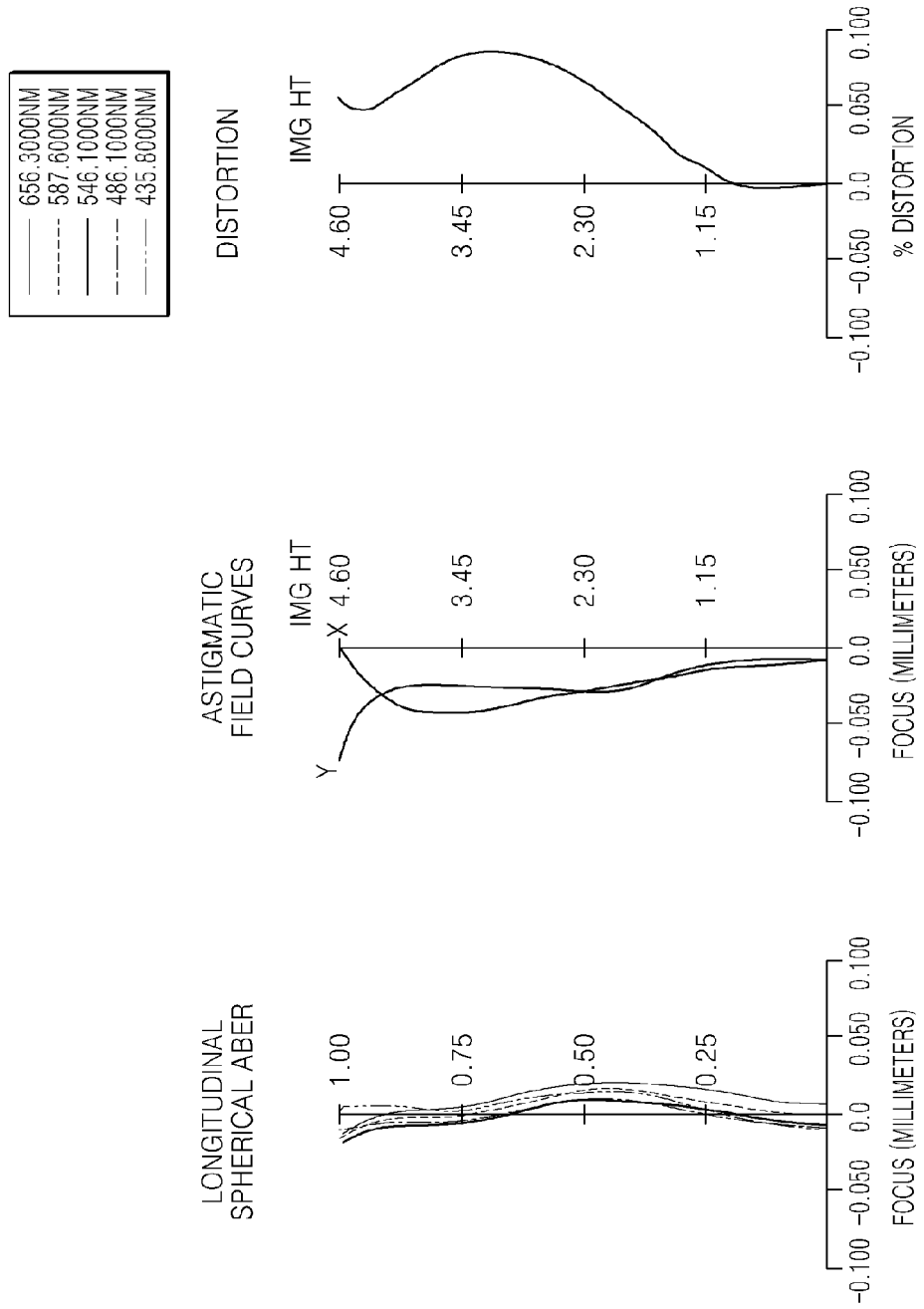
FIG. 2 is an aberration diagram illustrating longitudinal spherical aberration, astigmatic field curves, and distortion of the imaging lens system of FIG. 1.
Figure 3:
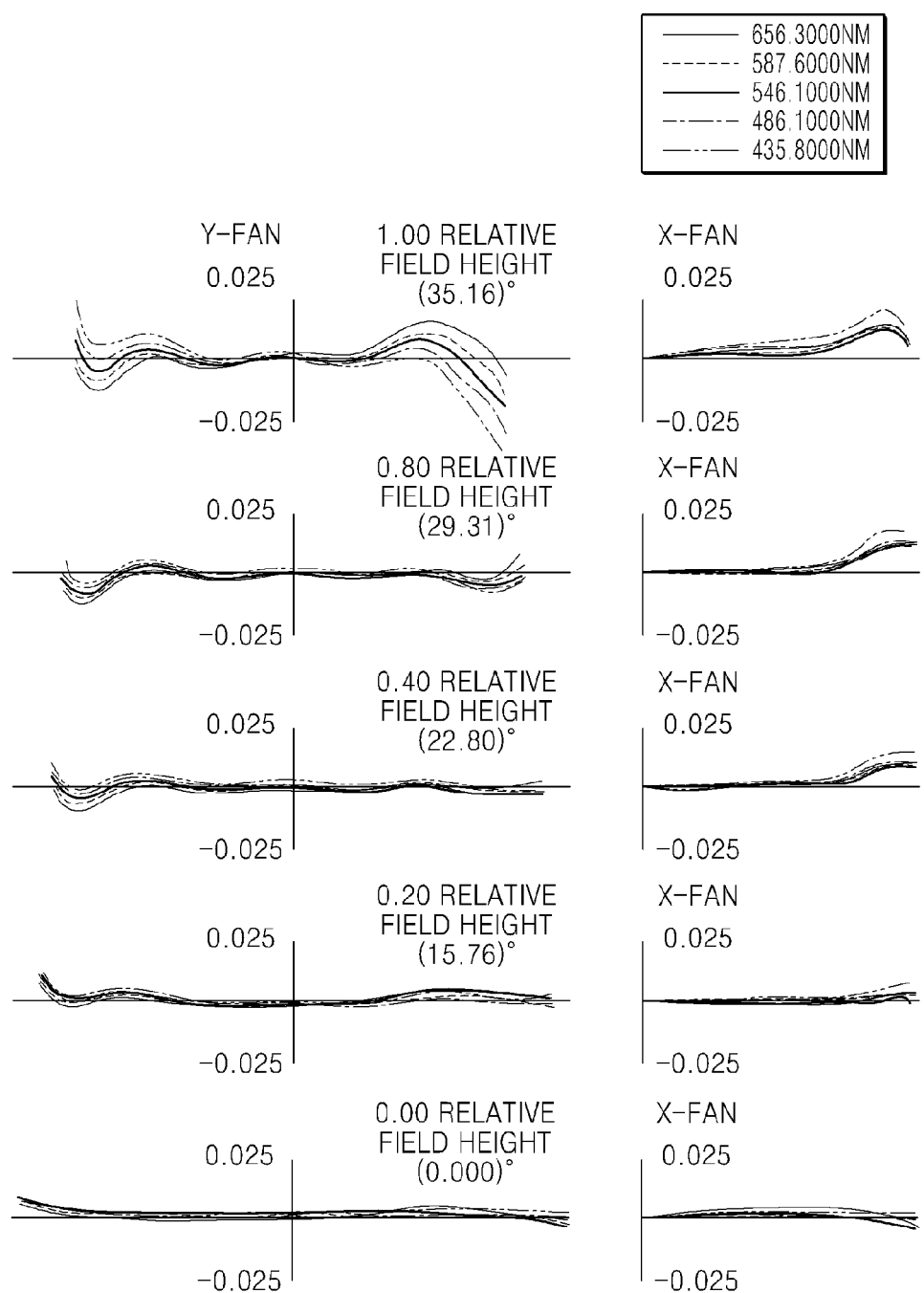
FIG. 3 is an aberration diagram illustrating coma aberration of the imaging lens system of FIG. 1.

FIG. 2 is an aberration diagram illustrating longitudinal spherical aberration, astigmatic field curves, and distortion of the imaging lens system of FIG. 1. FIG. 3 is an aberration diagram illustrating coma aberration of the imaging lens system of FIG. 1. The longitudinal spherical aberration and coma aberration are illustrated with respect to light having a wavelength of 656.30 nm, 587.60 nm, 546.10 nm, 486.10 nm, and 435.80 nm. The astigmatic field curves and distortion are illustrated with respect to light having a wavelength of 546.10 nm. Also, in the graph of the astigmatic field curves, sagittal field curvature and tangential field curvature are illustrated as "X" and "Y".

Second Embodiment

Figure 4:
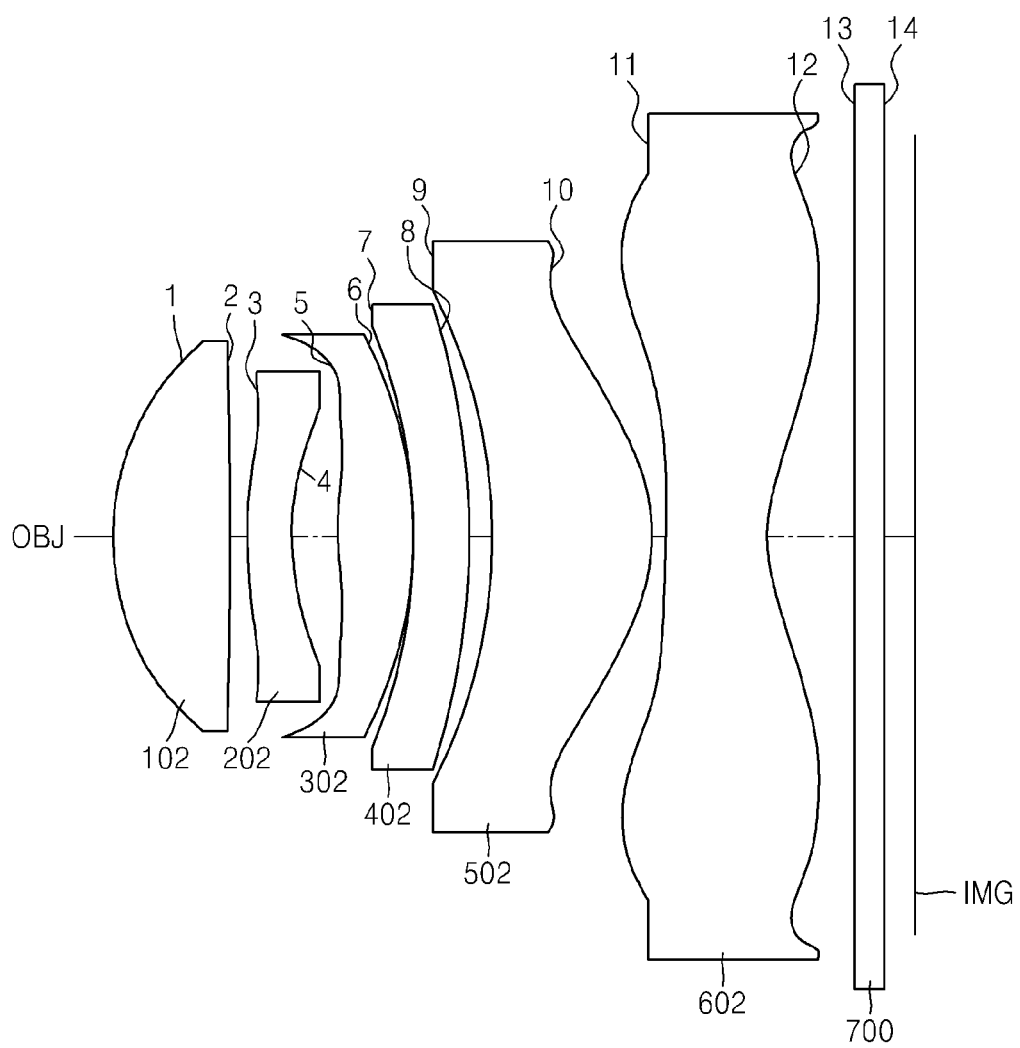
FIG. 4 is a cross-sectional view illustrating an optical arrangement of an imaging lens system according to a second embodiment.

FIG. 4 is a cross-sectional view illustrating the optical arrangement of the imaging lens system according to the second embodiment.

The imaging lens system includes the first lens 102 having a positive refractive power, the second lens 202 having a negative refractive power, the third lens 302 having a positive refractive power, the fourth lens 402 having a negative refractive power, the fifth lens 502 having a positive refractive power, and the sixth lens 602 having a negative refractive power that are arranged in order from the object OBJ side. A stop (not shown) is disposed on the image plane IMG-side surface of the first lens 102.

Lens data of the second embodiment is as follows.

TABLE 3

|  | Radius of curvature (R) | Thickness or interval | Refractive index (nd) | Abbe number (vd) |
|---|---|---|---|---|
| OBJ | Infinity | infinity | | |
| 1* | 3.039 | 1.3 | 1.544 | 56.09 |
| 2 (ST)* | 94.747 | 0.205 | | |
| 3* | 5.238 | 0.5 | 1.643 | 22.4 |
| 4* | 2.738 | 0.552 | | |
| 5* | 27.918 | 0.8 | 1.544 | 56.09 |
| 6* | −7.084 | 0.05 | | |
| 7 | −5.99 | 0.6 | 1.636 | 23.9 |
| 8 | −8.778 | 0.267 | | |
| 9 | −6.229 | 1.8 | 1.544 | 56.09 |
| 10* | −1.872 | 0.146 | | |
| 11* | −102.399 | 1.156 | 1.544 | 56.09 |
| 12* | 1.864 | 1 | | |
| 13 | Infinity | 0.3 | 1.517 | 64.2 |
| 14 | Infinity | 0.361 | | |
| IMG | Infinity | 0 | | |

Figure 5:
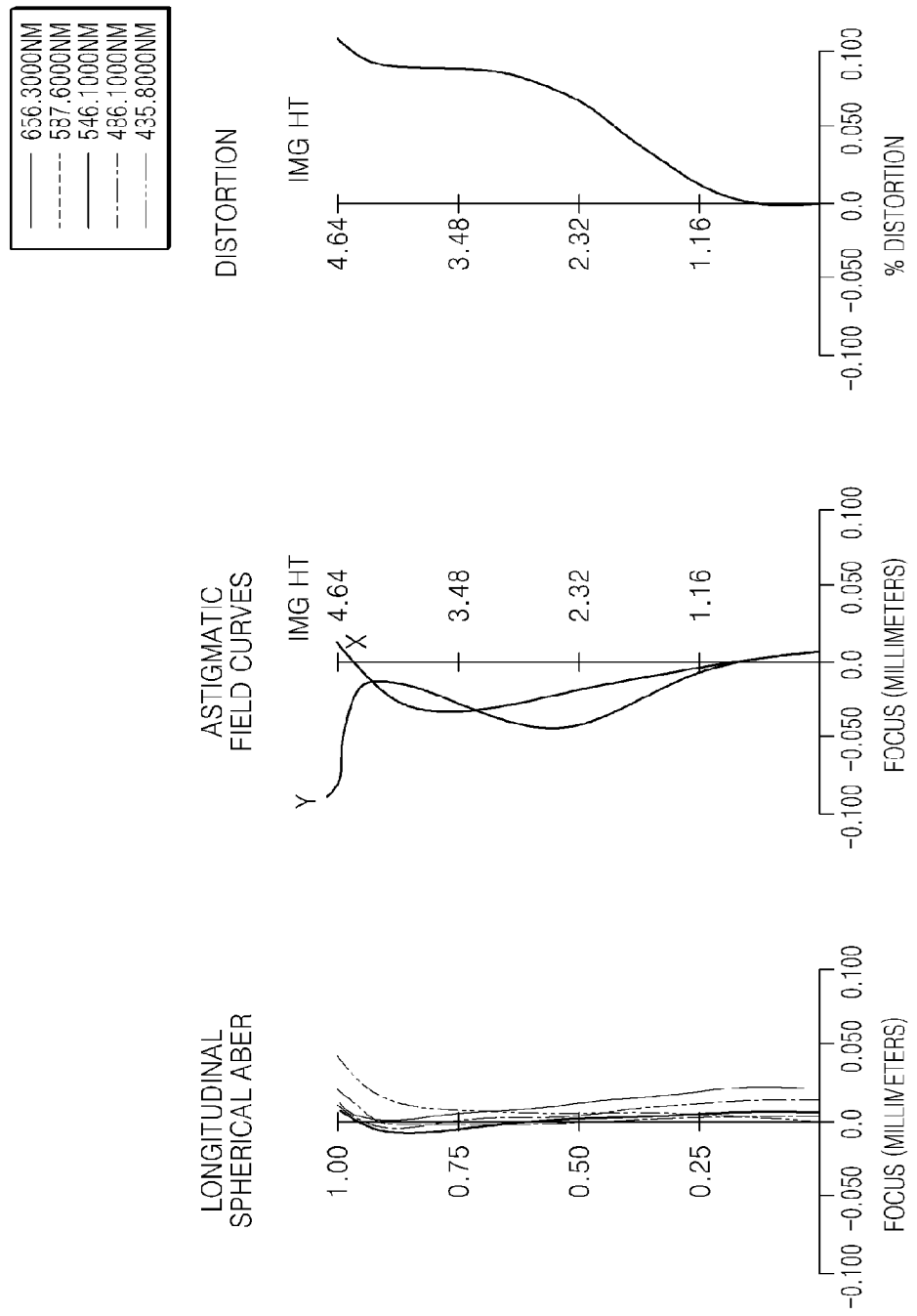
FIG. 5 is an aberration diagram illustrating longitudinal spherical aberration, astigmatic field curves, and distortion of the imaging lens system of FIG. 4.
Figure 6:
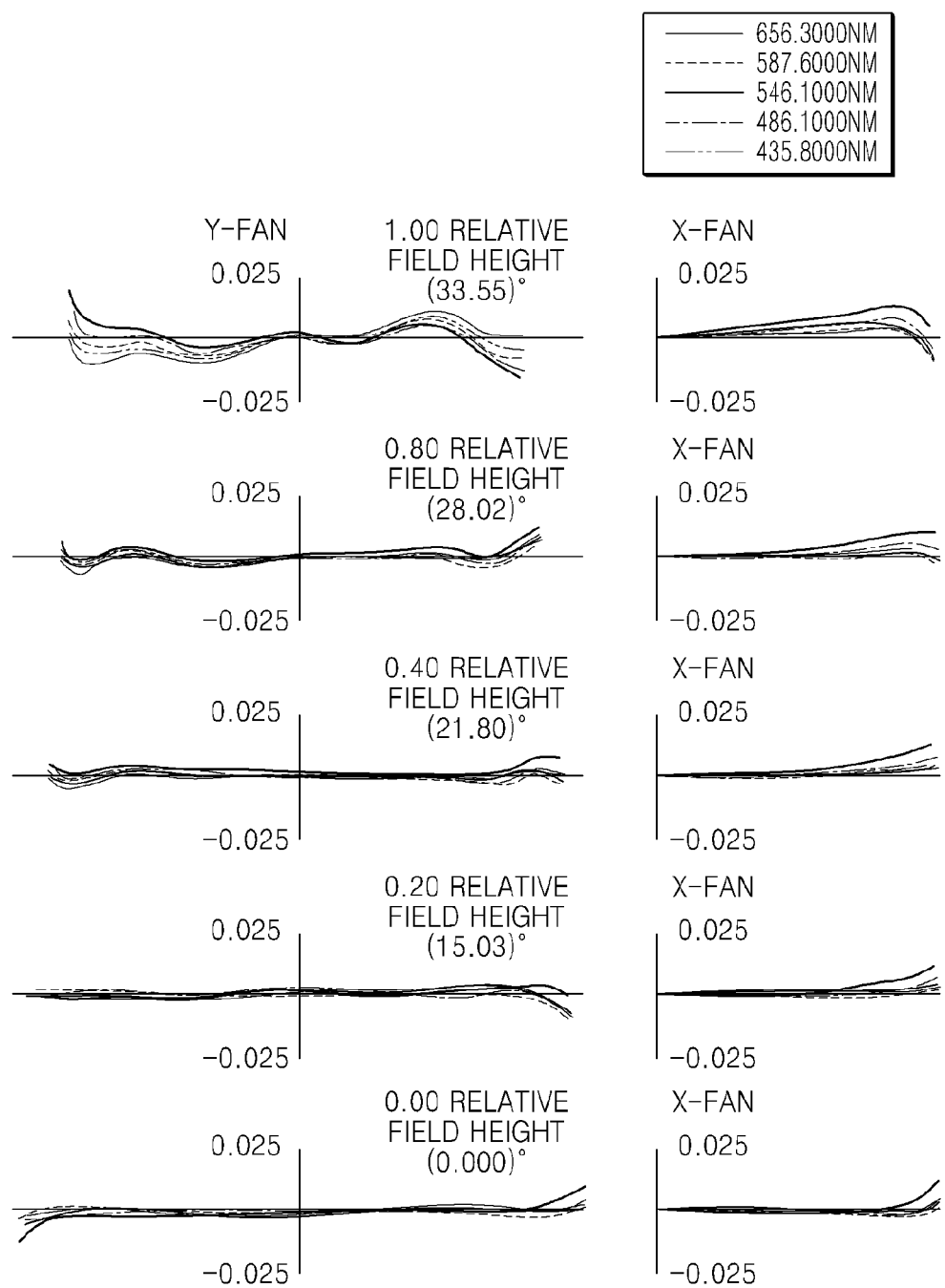
FIG. 6 is an aberration diagram illustrating coma aberration of the imaging lens system of FIG. 4.

FIG. 5 is an aberration diagram illustrating longitudinal spherical aberration, astigmatic field curves, and distortion of the imaging lens system of FIG. 4. FIG. 6 is an aberration diagram illustrating coma aberration of the imaging lens system of FIG. 4.

Third Embodiment

Figure 7:
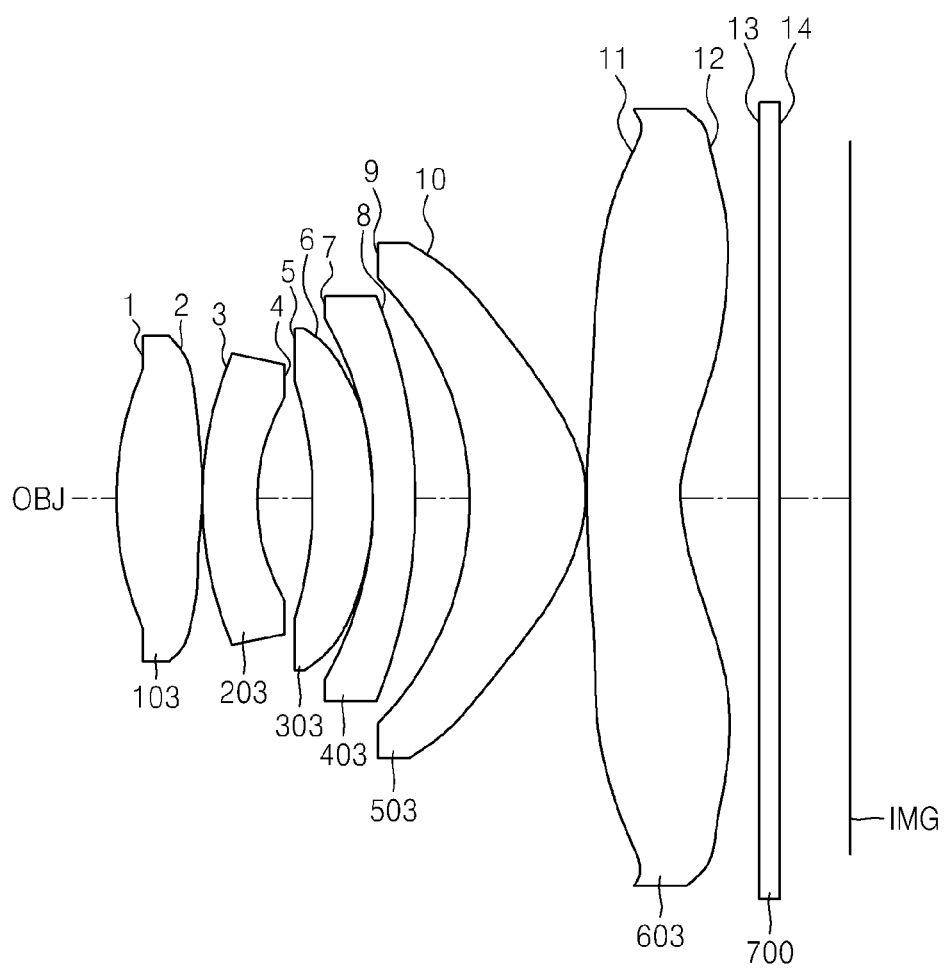
FIG. 7 is a cross-sectional view illustrating an optical arrangement of an imaging lens system according to a third embodiment.

FIG. 7 is a cross-sectional view illustrating the optical arrangement of the imaging lens system according to the third embodiment.

The imaging lens system includes the first lens 103 having a positive refractive power, the second lens 203 having a negative refractive power, the third lens 303 having a positive refractive power, the fourth lens 403 having a negative refractive power, the fifth lens 503 having a positive refractive power, and the sixth lens 603 having a negative refractive power that are arranged in order from the object OBJ side. A stop (not shown) is disposed on the object OBJ side of the first lens 103.

Lens data of the third embodiment is as follows.

TABLE 5

|  | Radius of curvature (R) | Thickness or interval | Refractive index (nd) | Abbe number (vd) |
|---|---|---|---|---|
| OBJ | infinity | Infinity | | |
| 1 (ST)* | 3.666 | 1.1 | 1.544 | 56.1 |
| 2* | −10.298 | 0.03 | | |
| 3* | 4.515 | 0.68 | 1.643 | 22.4 |
| 4* | 2.297 | 0.7 | | |
| 5* | −11.064 | 0.8 | 1.531 | 55.75 |
| 6* | −4.64 | 0.03 | | |
| 7 | −4.646 | 0.5 | 1.643 | 22.4 |
| 8 | −7.744 | 0.74 | | |
| 9 | −4.033 | 1.48 | 1.544 | 56.1 |
| 10* | −1.568 | 0.03 | | |
| 11* | 11.637 | 1.19 | 1.531 | 55.75 |
| 12* | 1.719 | 1 | | |
| 13 | infinity | 0.3 | 1.517 | 64.2 |
| 14 | infinity | 0.9 | | |
| IMG | infinity | 0.02 | | |

TABLE 4

| Surface | K | A | B | C | D | E | F |
|---|---|---|---|---|---|---|---|
| 1 | 1.77E−01 | 1.08E−03 | −5.54E−04 | 3.99E−04 | −6.19E−05 | | |
| 2 | 9.90E+01 | −5.51E−03 | 4.94E−03 | −9.60E−04 | −1.82E−04 | 4.34E−05 | |
| 3 | −1.33E+01 | −2.46E−02 | 1.31E−02 | −4.40E−03 | 3.06E−04 | 4.22E−05 | |
| 4 | 0.00E+00 | −3.72E−02 | 1.53E−02 | −4.96E−03 | 6.25E−04 | | |
| 5 | −9.47E+01 | −1.08E−02 | 5.85E−04 | 7.72E−04 | −2.86E−04 | | |
| 6 | 1.70E+00 | −8.11E−03 | 2.41E−03 | −5.71E−04 | 4.64E−05 | | |
| 10 | −4.32E+00 | −1.32E−02 | 2.72E−03 | −4.45E−04 | 5.99E−05 | −2.79E−06 | |
| 11 | −4.55E+01 | −1.62E−02 | 1.20E−03 | 3.57E−05 | −3.70E−06 | −3.96E−08 | 4.75E−09 |
| 12 | −6.23E+00 | −9.96E−03 | 1.05E−03 | −9.84E−05 | 6.10E−06 | −2.37E−07 | 4.37E−09 |

TABLE 6

| | K | A | B | C | D | E | F |
|---|---|---|---|---|---|---|---|
| 1 | −0.01632 | −1.85E−03 | −3.72E−05 | −5.25E−04 | 1.43E−04 | −4.20E−05 | 7.06E−07 |
| 2 | −57.1935 | 3.91E−03 | −2.23E−03 | −5.05E−04 | 8.17E−05 | 1.06E−05 | −5.64E−06 |
| 3 | 2.28203 | −9.25E−03 | 3.53E−03 | −1.71E−03 | 2.34E−04 | −7.32E−07 | 0.00E+00 |
| 4 | −0.49077 | −2.11E−02 | 6.46E−03 | 1.47E−03 | −1.67E−03 | 3.76E−04 | 0.00E+00 |
| 5 | −1 | −1.35E−02 | 1.03E−03 | −1.45E−03 | 8.38E−04 | −3.21E−04 | 5.21E−05 |
| 6 | −1 | −7.84E−03 | 2.00E−03 | −1.57E−03 | 4.59E−04 | −8.34E−05 | 5.31E−06 |
| 10 | −3.56857 | −1.92E−02 | 3.49E−03 | −5.77E−04 | 6.55E−05 | −2.13E−06 | −8.28E−08 |
| 11 | −1 | −7.57E−03 | 5.93E−04 | 5.32E−06 | −2.43E−06 | 1.13E−07 | −1.82E−09 |
| 12 | −6.47103 | −8.72E−03 | 9.60E−04 | −9.72E−05 | 5.67E−06 | −1.53E−07 | 1.43E−09 |

Figure 8:
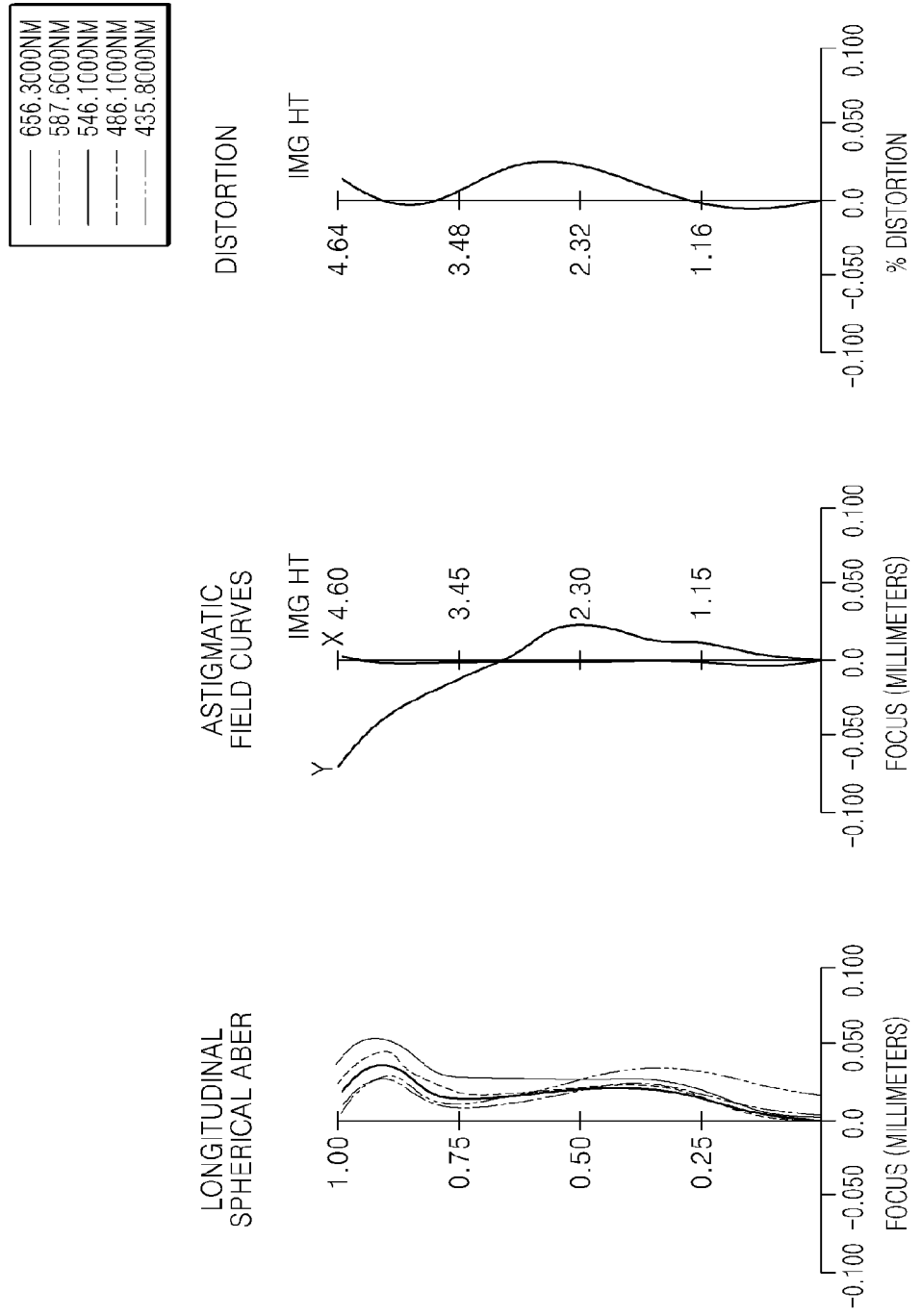
FIG. 8 is an aberration diagram illustrating longitudinal spherical aberration, astigmatic field curves, and distortion of the imaging lens system of FIG. 7.
Figure 9:
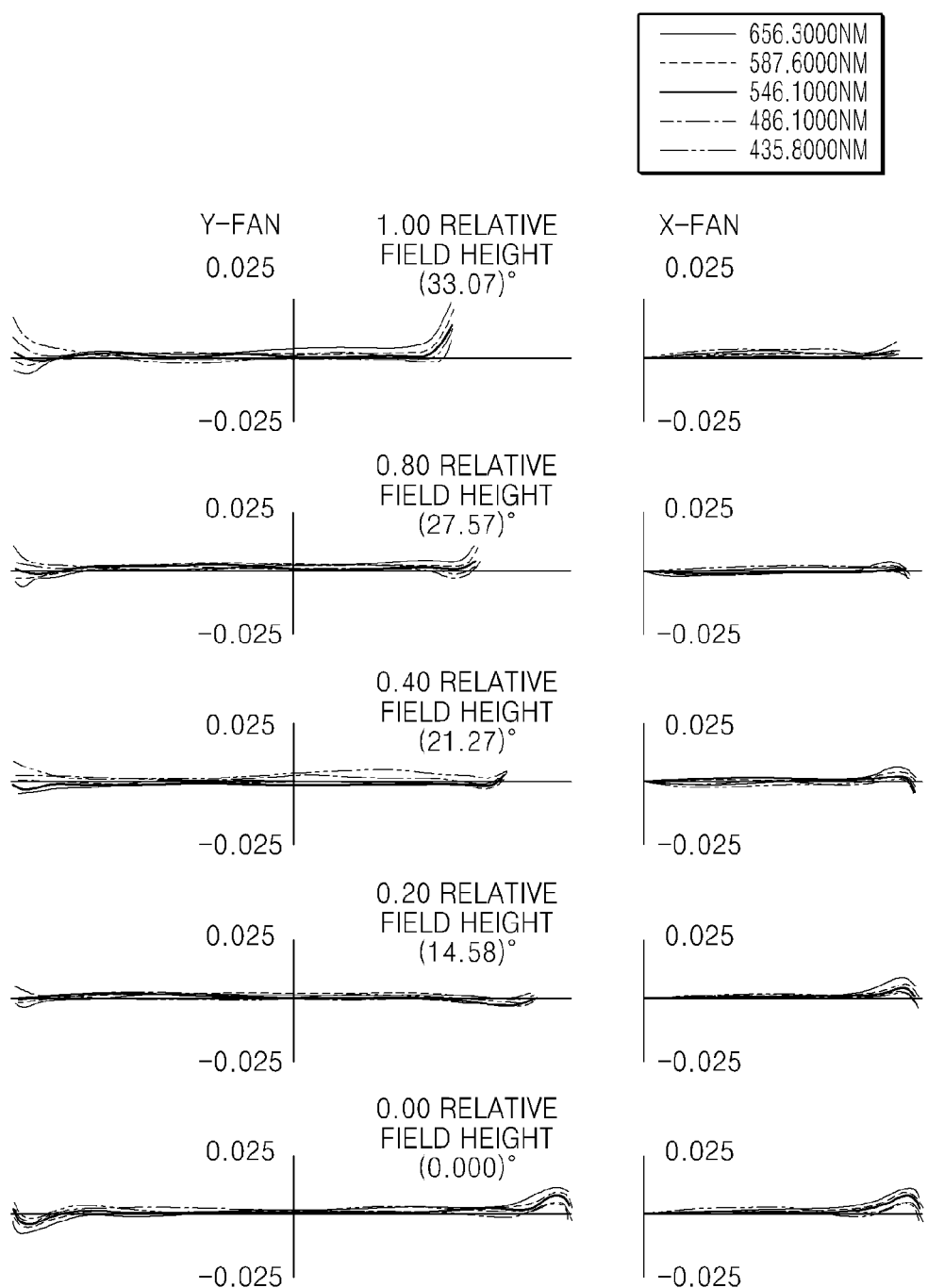
FIG. 9 is an aberration diagram illustrating coma aberration of the imaging lens system of FIG. 7.

FIG. 8 is an aberration diagram illustrating longitudinal spherical aberration, astigmatic field curves, and distortion of the imaging lens system of FIG. 7. FIG. 9 is an aberration diagram illustrating coma aberration of the imaging lens system of FIG. 7.

Fourth Embodiment

Figure 10:
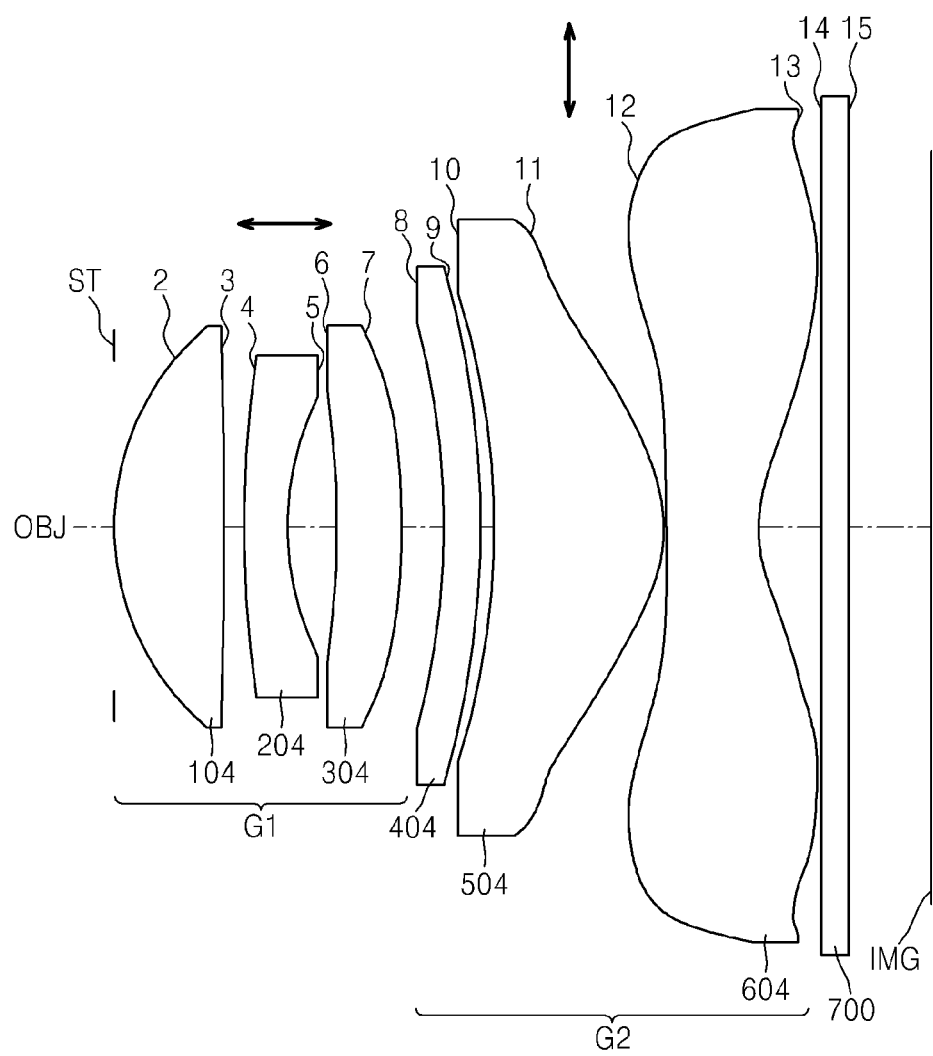
FIG. 10 is a cross-sectional view illustrating an optical arrangement of an imaging lens system according to a fourth embodiment.

FIG. 10 is a cross-sectional view illustrating the optical arrangement of the imaging lens system according to the fourth embodiment.

The imaging lens system includes the first lens 104 having a positive refractive power, the second lens 204 having a negative refractive power, the third lens 304 having a positive refractive power, the fourth lens 404 having a negative refractive power, the fifth lens 504 having a positive refractive power, and the sixth lens 604 having a negative refractive power that are arranged in order from the object OBJ side. A stop ST is disposed on the object OBJ side of the first lens 104.

The first lens 104, the second lens 204, the third lens 304, the fourth lens 404, the fifth lens 504, and the sixth lens 604 may be divided into a front group G1 formed of a plurality of lenses that are relatively located on the object OBJ side and a rear group G2 formed of the rest of the lenses that are relatively located on the image plane IMG side. The front group G1 may be a focusing lens group. That is, when performing focusing to a nearest distance from an infinite object distance, the front group G1 moves along a direction of an optical axis, and the rear group G2 is fixed. As illustrated in the drawing, the front group G1 may be formed of the first lens 104, the second lens 204, and the third lens 304, and the rear group G2 may be formed of the fourth lens 404, the fifth lens 504, and the sixth lens 604.

Figure 11A:
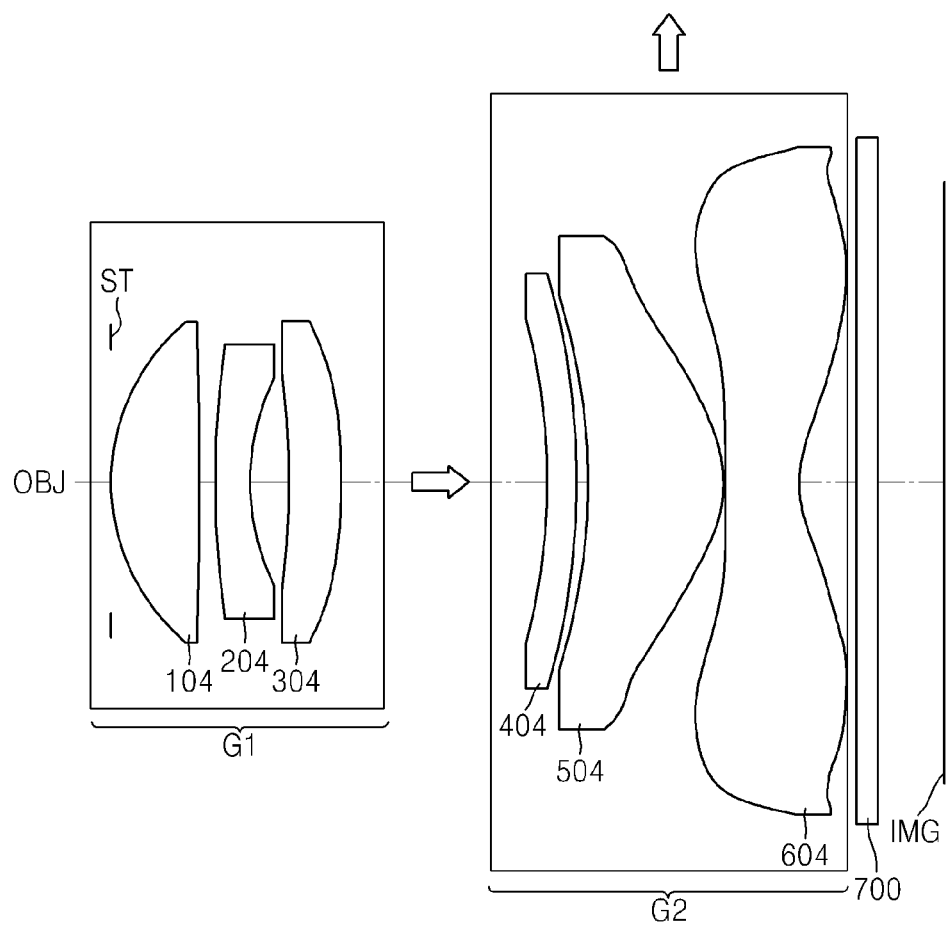
FIGS. 11A and 11B are cross-sectional views illustrating an example in which the imaging lens system of FIG. 10 is formed to be retractable, and FIGS. 11A and 11B respectively illustrate an optical arrangement in a photographing mode and a non-photographing mode.
Figure 11B:
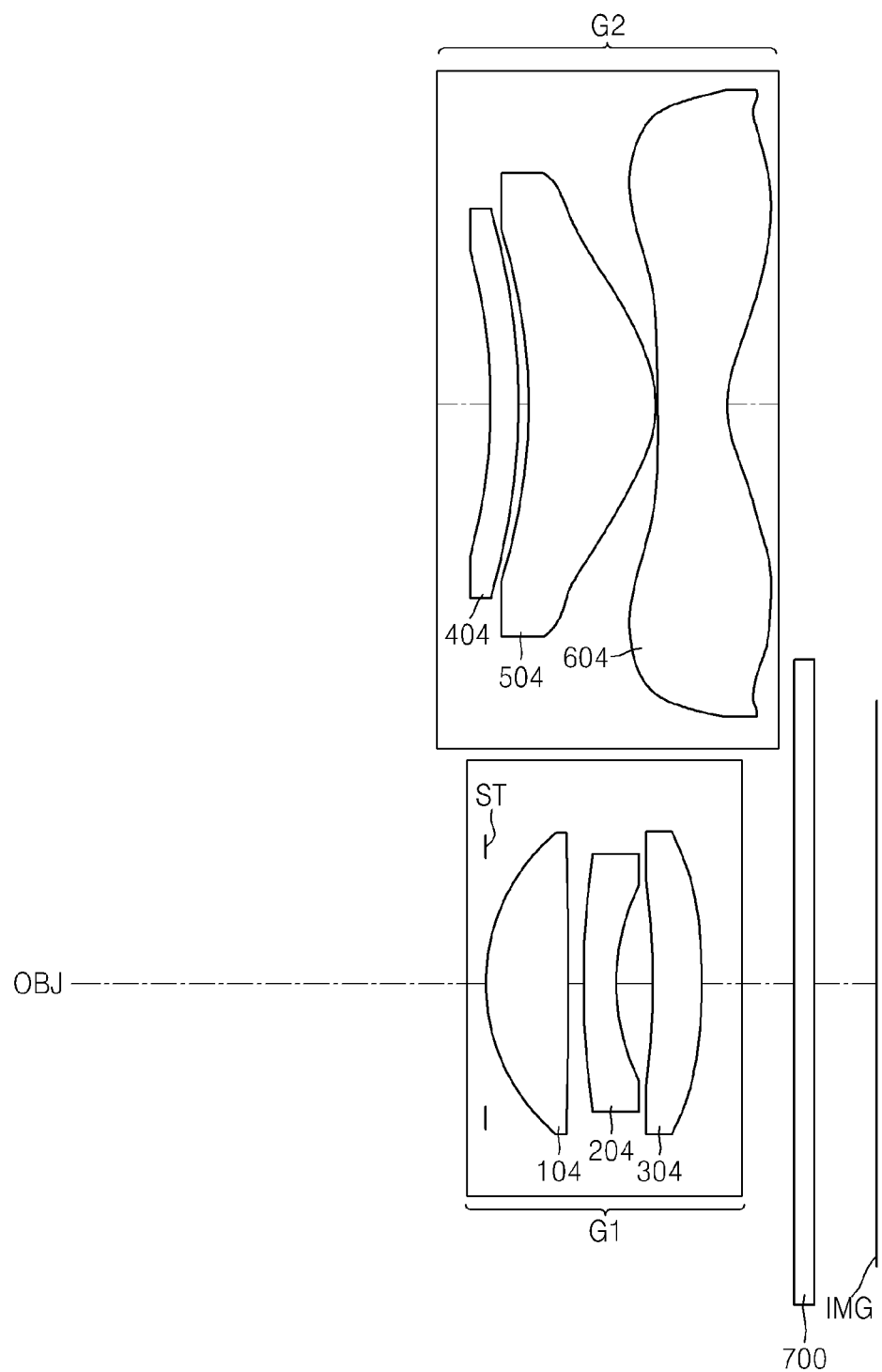

FIGS. 11A and 11B are cross-sectional views illustrating an example in which the imaging lens system of FIG. 10 is formed to be retractable, and FIGS. 11 and 11B respectively illustrate an optical arrangement in a photographing mode and a non-photographing mode.

The imaging lens system may have a retractable configuration so that a storage size may be minimized in the non-photographing mode.

The first 104, the second lens 204, the third lens 304, the fourth lens 404, the fifth lens 504, and the sixth lens 604 may be divided into a front group G1 formed of a plurality of lenses that are relatively located on the object OBJ side and a rear group G2 formed of the rest of the lenses that are relatively located on the image plane IMG side. As illustrated in FIG. 11A, in the photographing mode, the front group G1 and the rear group G2 are arranged along a common optical axis. The arrow directions illustrated in FIG. 11A indicate directions in which the front group G1 and the rear group G2 will move to form the non-photographing mode. As illustrated in FIG. 11B, in the non-photographing mode, the rear group G2 is arranged by moving in a direction perpendicular to the optical axis, and the front group G1 may be arranged by moving toward the image plane IMG side along the optical axis. In the non-photographing mode, the optical total length is minimized so that the storage size is reduced.

Lens data of the fourth embodiment is as follows.

TABLE 7

| | Radius of curvature (R) | Thickness or interval | Refractive index (nd) | Abbe number (vd) |
|---|---|---|---|---|
| OBJ | infinity | D0 | | |
| 1 (ST) | infinity | 0 | | |
| 2* | 3.03 | 1.203 | 1.544 | 56.09 |
| 3* | 324.247 | 0.241 | | |
| 4* | 6.392 | 0.483 | 1.643 | 22.4 |
| 5* | 2.855 | 0.529 | | |
| 6* | −605.099 | 0.73 | 1.535 | 55.71 |
| 7* | −9.595 | D1 | | |
| 8 | −9.805 | 0.41 | 1.636 | 23.9 |
| 9 | −11.114 | 0.166 | | |
| 10 | −8.749 | 1.873 | 1.535 | 55.71 |
| 11* | −1.659 | 0.029 | | |
| 12* | 91.842 | 1.032 | 1.535 | 55.71 |
| 13* | 1.616 | 0.648 | | |
| 14 | infinity | 0.3 | 1.517 | 64.2 |
| 15 | infinity | 0.3 | | |
| IMG | infinity | 1.05 | | |

TABLE 8

| | Pos1 | Pos2 | Pos3 |
|---|---|---|---|
| D0 | infinity | 1200 | 300 |
| D1 | 0.463 | 0.512 | 0.67 |
| Ω | 32.982 | 32.802 | 32.237 |
| F/# | 1.885 | 1.898 | 1.938 |
| TL | 9.157 | 9.206 | 9.368 |

TABLE 9

| Surface | K | A | B | C | D | E | F |
|---|---|---|---|---|---|---|---|
| 2 | 7.92E−02 | 5.71E−04 | −3.34E−05 | 1.00E−04 | −2.36E−05 | | |
| 3 | −9.90E+01 | −3.36E−03 | 3.57E−03 | −1.04E−03 | 5.46E−05 | 6.13E−06 | |
| 4 | −1.23E+01 | −2.26E−02 | 1.11E−02 | −2.96E−03 | 2.66E−04 | 6.83E−06 | |

TABLE 9-continued

| Surface | K | A | B | C | D | E | F |
|---|---|---|---|---|---|---|---|
| 5 | 0.00E+00 | −3.13E−02 | 1.22E−02 | −3.00E−03 | 3.95E−04 | | |
| 6 | 1.23E+01 | −1.48E−02 | 7.02E−04 | −2.46E−04 | 3.34E−05 | | |
| 7 | 3.16E+00 | −7.30E−03 | 8.08E−04 | −3.20E−04 | 4.93E−05 | | |
| 11 | −4.48E+00 | −1.27E−02 | 2.39E−03 | −3.29E−04 | 3.66E−05 | −1.59E−06 | |
| 12 | −9.90E+01 | −1.43E−02 | 9.68E−04 | 2.71E−05 | −2.72E−06 | −3.00E−08 | 3.37E−09 |
| 13 | −5.94E+00 | −9.83E−03 | 1.03E−03 | −8.96E−05 | 4.68E−06 | −1.34E−07 | 1.84E−09 |

Figure 12:
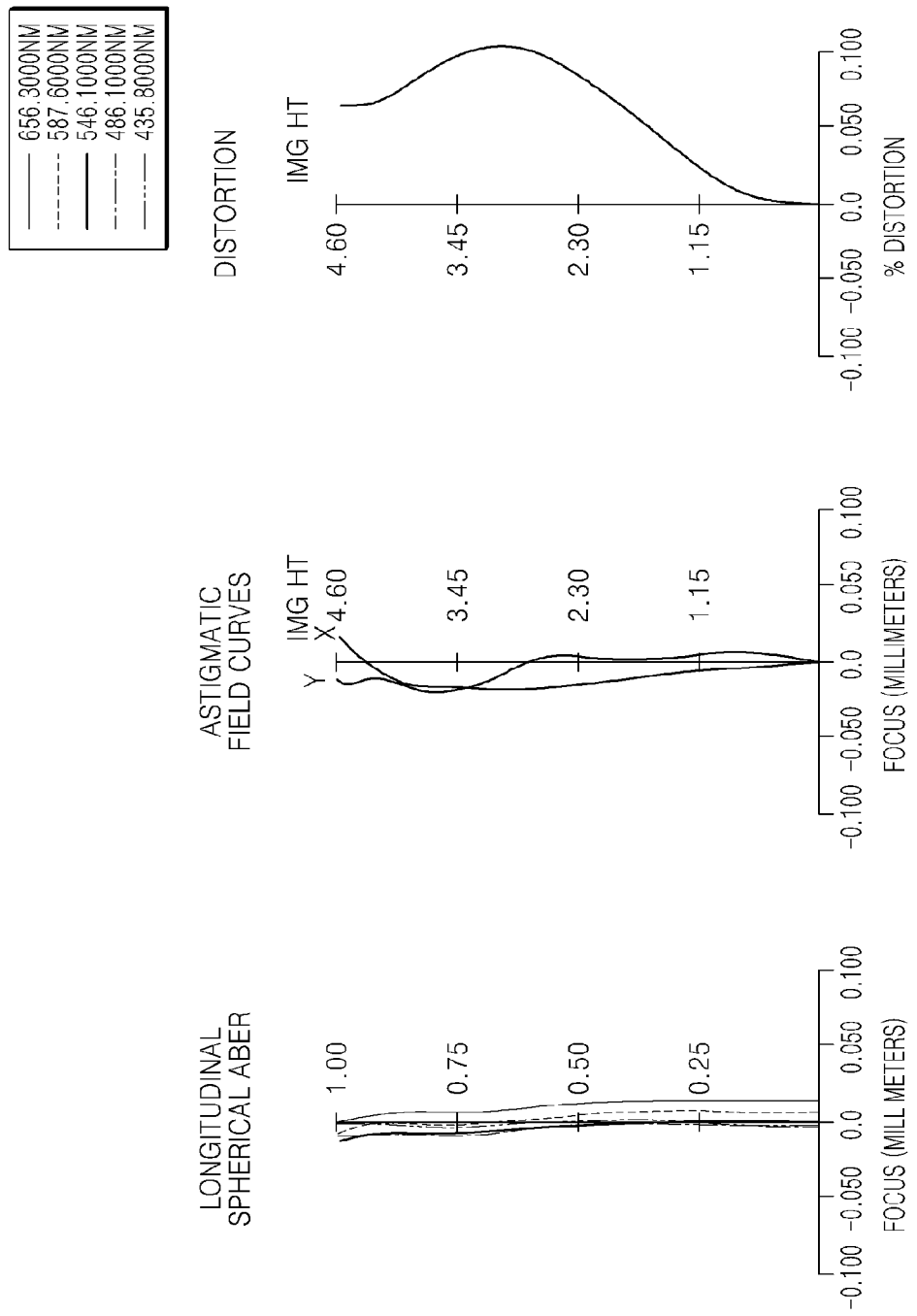
FIG. 12 is an aberration diagram illustrating longitudinal spherical aberration, astigmatic field curves, and distortion of the imaging lens system of FIG. 10.
Figure 13:
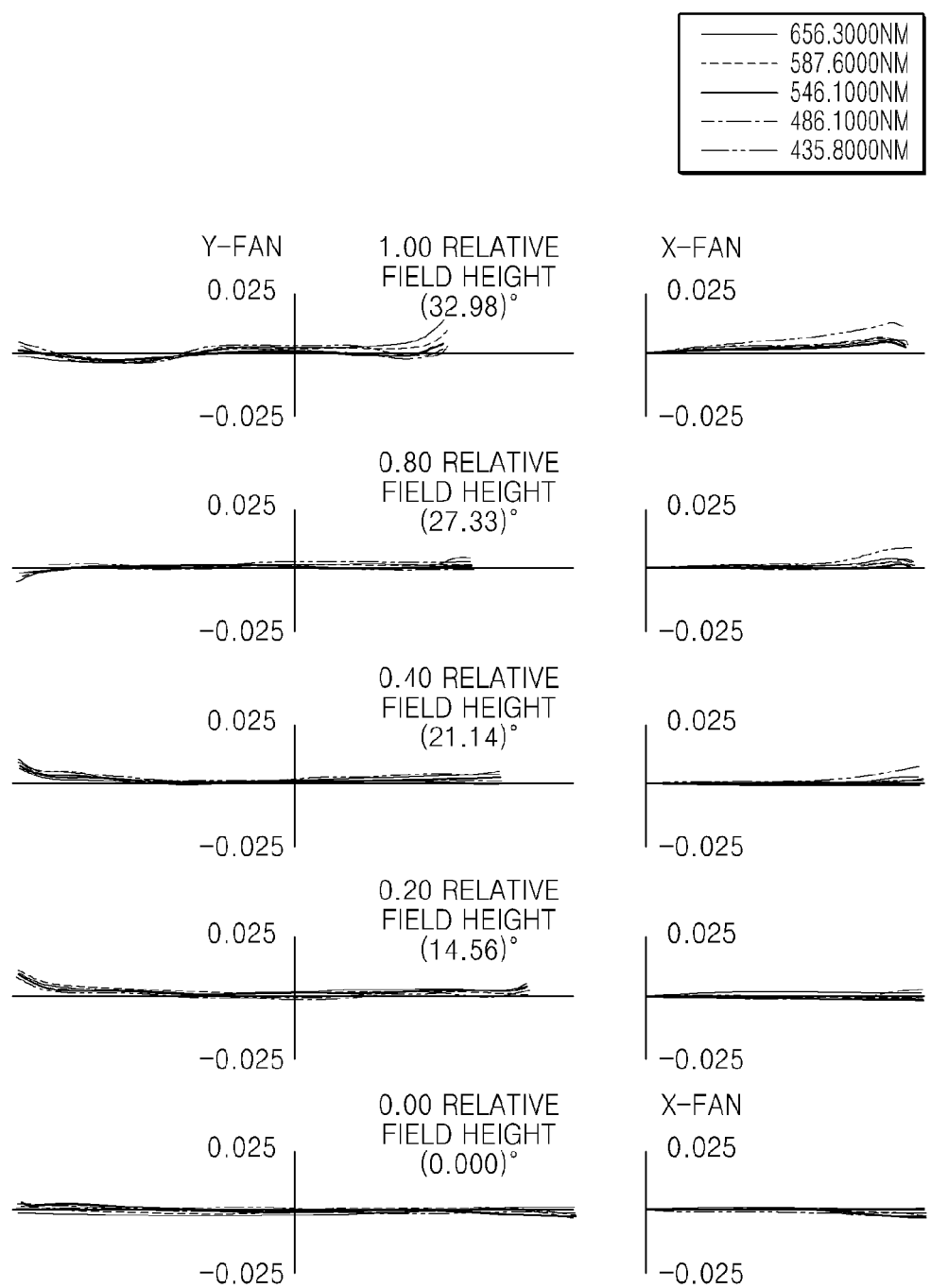
FIG. 13 is an aberration diagram illustrating coma aberration of the imaging lens system of FIG. 10.

FIG. 12 is an aberration diagram illustrating longitudinal spherical aberration, astigmatic field curves, and distortion of the imaging lens system of FIG. 10. FIG. 13 is an aberration diagram illustrating coma aberration of the imaging lens system of FIG. 10.

Fifth Embodiment

Figure 14:
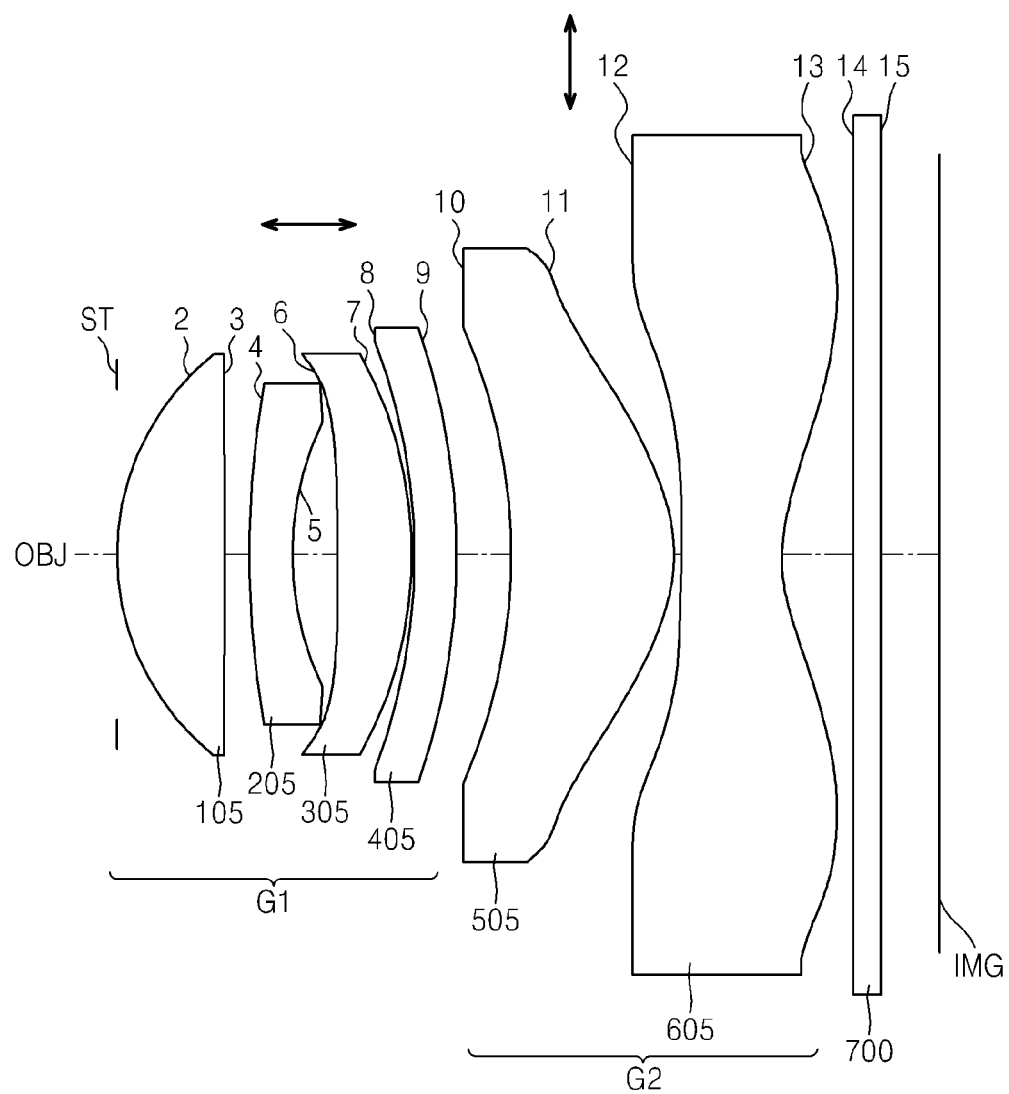
FIG. 14 is a cross-sectional view illustrating an optical arrangement of an imaging lens system according to a fifth embodiment.

FIG. 14 is a cross-sectional view illustrating the optical arrangement of the imaging lens system according to the fifth embodiment.

The imaging lens system includes the first lens 105 having a positive refractive power, the second lens 205 having a negative refractive power, the third lens 305 having a positive refractive power, the fourth lens 405 having a negative refractive power, the fifth lens 505 having a positive refractive power, and the sixth lens 605 having a negative refractive power that are arranged in order from the object OBJ side. A stop ST is disposed on the object OBJ side of the first lens 105.

A front group G1 may be formed of the first lens 105, the second lens 205, the third lens 305, and the fourth lens 405, and the rear group G2 may be formed of the fifth lens 505 and the sixth lens 605. The front group G1 forms a focusing lens group. When performing focusing to a nearest distance from an infinite object distance, the rear group G2 is fixed and the front group G1 moves along an optical axis to perform focusing. In addition, the front group G1 and the rear group G2 are configured to be able to move along the illustrated arrow directions, that is, the front group G1 is configured to be able to move along a direction of an optical axis and the rear group G2 is configured to be able to move along a direction perpendicular to the optical axis so that the front group G1 and the rear group G2 may form a retractable system. For example, as illustrated in FIGS. 11A and 11B, in the photographing mode, the front group G1 and the rear group G2 are arranged along the common optical axis, and, in the non-photographing mode, the rear group G2 moves along the direction perpendicular to the optical axis and the front group G1 moves toward the image plane IMG along the optical axis so that the optical total length may be minimized.

Lens data of the fifth embodiment is as follows.

TABLE 10

| | Radius of curvature (R) | Thickness or interval | Refractive index (nd) | Abbe number (vd) |
|---|---|---|---|---|
| OBJ | infinity | D0 | | |
| 1 (ST) | Infinity | 0 | | |
| 2* | 3.009 | 1.199 | 1.544 | 56.09 |
| 3* | 106.705 | 0.283 | | |
| 4* | 6.785 | 0.465 | 1.643 | 22.4 |
| 5* | 2.986 | 0.501 | | |
| 6* | 132.24 | 0.82 | 1.544 | 56.09 |
| 7* | −6.827 | 0.029 | | |
| 8 | −7.274 | 0.477 | 1.636 | 23.9 |
| 9 | −8.221 | D1 | | |
| 10 | −6.448 | 1.818 | 1.544 | 56.09 |
| 11* | −1.82 | 0.074 | | |
| 12* | −42.751 | 1.123 | 1.544 | 56.09 |
| 13* | 1.842 | 0.8 | | |
| 14 | Infinity | 0.3 | 1.5168 | 64.2 |
| IMG | Infinity | 0.666 | | |

TABLE 11

| | Pos1 | Pos2 | Pos3 |
|---|---|---|---|
| D0 | Infinity | 1200 | 300 |
| D1 | 0.617 | 0.658 | 0.79 |
| ω | 33.099 | 32.954 | 32.502 |
| F/# | 1.885 | 1.896 | 1.931 |
| TL | 9.172 | 9.213 | 9.35 |

TABLE 12

| Surface | K | A | B | C | D | E | F |
|---|---|---|---|---|---|---|---|
| 2 | 7.49E−02 | 3.91E−04 | 1.12E−05 | 8.24E−05 | −1.94E−05 | | |
| 3 | −9.90E+01 | −3.91E−03 | 3.47E−03 | −9.85E−04 | 6.91E−05 | 2.35E−06 | |
| 4 | −1.52E+01 | −2.29E−02 | 1.11E−02 | −2.92E−03 | 2.79E−04 | 2.67E−06 | |
| 5 | 0.00E+00 | −3.06E−02 | 1.25E−02 | −3.02E−03 | 3.96E−04 | | |
| 6 | −9.90E+01 | −1.38E−02 | 5.03E−04 | −2.48E−04 | 1.66E−05 | | |
| 7 | −9.04E−01 | −7.39E−03 | 5.62E−04 | −3.33E−04 | 4.71E−05 | | |
| 11 | −4.47E+00 | −1.22E−02 | 2.42E−03 | −3.39E−04 | 3.59E−05 | −1.52E−06 | |
| 12 | 6.13E+01 | −1.33E−02 | 9.24E−04 | 2.53E−05 | −2.56E−06 | −1.75E−08 | 2.33E−09 |
| 13 | −6.20E+00 | −9.23E−03 | 9.95E−04 | −8.81E−05 | 4.53E−06 | −1.30E−07 | −1.74E−09 |

Figure 15:
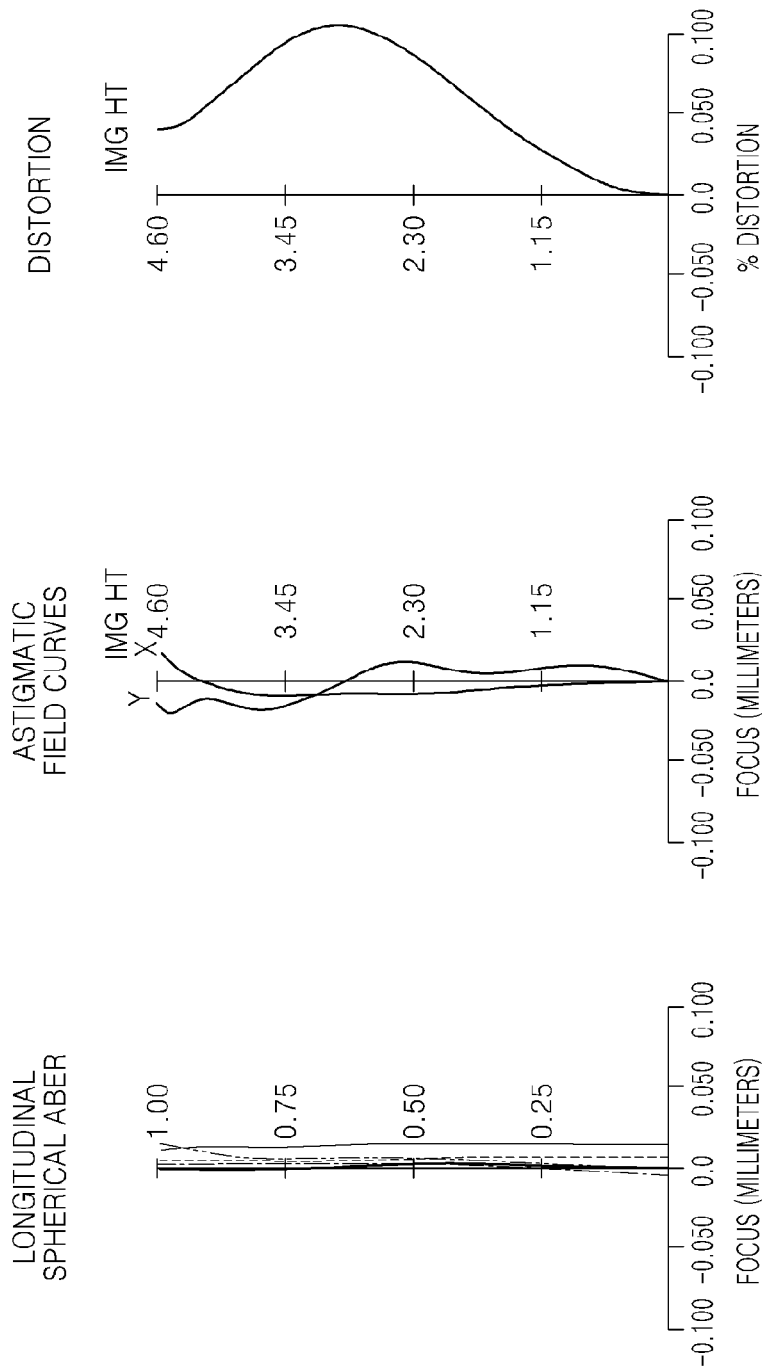
FIG. 15 is an aberration diagram illustrating longitudinal spherical aberration, astigmatic field curves, and distortion of the imaging lens system of FIG. 14.
Figure 16:
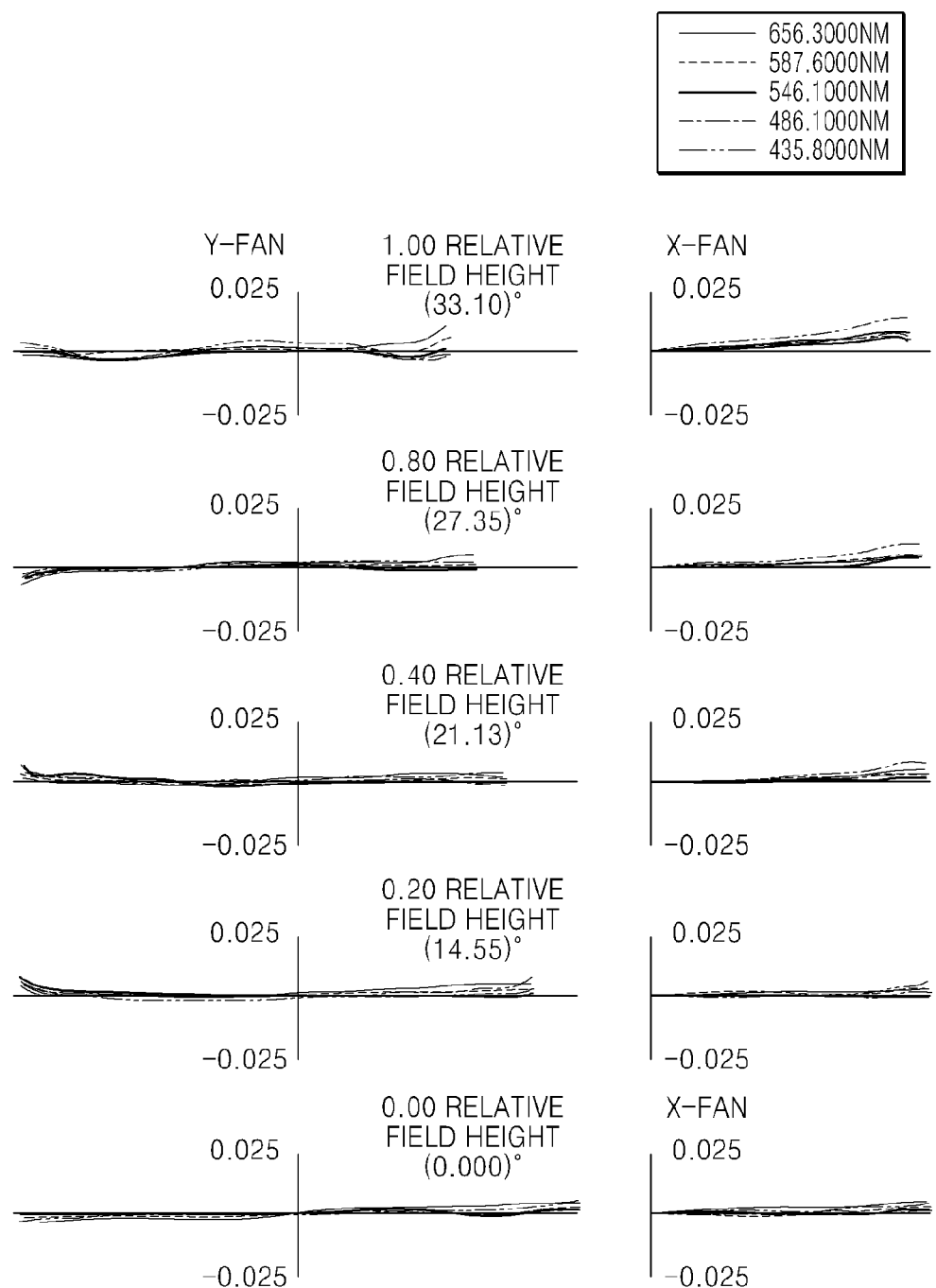
FIG. 16 is an aberration diagram illustrating coma aberration of the imaging lens system of FIG. 14.

FIG. 15 is an aberration diagram illustrating longitudinal spherical aberration, astigmatic field curves, and distortion of the imaging lens system of FIG. 14. FIG. 16 is an aberration diagram illustrating coma aberration of the imaging lens system of FIG. 14.

The below table illustrates an optical total length TL, a focal length f, an F-number, a focal length f1, f2, f3, f4, f5, and f6 of each of the lenses, and a half angle of view ω of the imaging lens system according to the embodiments described herein.

TABLE 13

|  | 1st embodiment | 2nd embodiment | 3rd embodiment | 4th embodiment | 5th embodiment |
|---|---|---|---|---|---|
| TL | 8.45 mm | 9.04 mm | 9.50 mm | 9.16 mm | 9.17 mm |
| f | 6.45 mm | 6.80 mm | 7.04 mm | 7.00 mm | 7.00 mm |
| f-number | 1.88 | 1.88 | 2.07 | 1.88 | 1.88 |
| ω | 35.16° | 33.55° | 33.07° | 32.98° | 33.10° |
| f1 | 5.29 mm | 5.72 mm | 5.09 mm | 5.59 mm | 5.64 mm |
| f2 | −9.48 mm | −9.58 mm | −8.19 mm | −8.39 mm | −8.63 mm |
| f3 | 10.97 mm | 10.42 mm | 14.36 mm | 18.14 mm | 11.90 mm |
| f4 | −24.05 mm | −32.09 mm | −19.11 mm | −147.85 mm | −122.55 mm |
| f5 | 3.45 mm | 4.27 mm | 3.87 mm | 3.49 mm | 4.07 mm |
| f6 | −2.83 mm | −3.34 mm | −3.95 mm | −3.07 mm | −3.20 mm |

The below table illustrates that the embodiments satisfy the described conditions 1 through 11.

TABLE 14

| Conditions | 1st embodiment | 2nd embodiment | 3rd embodiment | 4th embodiment | 5th embodiment |
|---|---|---|---|---|---|
| (1) $20 < V_1-V_2 < 45$ | 33.7 | 33.7 | 33.7 | 33.7 | 33.7 |
| (2) $20 < V_1-V_4 < 45$ | 32.2 | 32.2 | 33.7 | 32.2 | 32.2 |
| (3) $1.5 \leq f/EPD \leq 2.4$ | 1.88 | 1.88 | 2.07 | 1.88 | 1.88 |
| (4) $0.70 < f/f1 < 1.9$ | 1.22 | 1.19 | 1.38 | 1.25 | 1.25 |
| (5) $0.9 < TL/f < 2.0$ | 1.31 | 1.33 | 1.35 | 1.31 | 1.31 |
| (6) $1.0 < f/f5 < 3.0$ | 1.87 | 1.59 | 1.82 | 2.01 | 2.01 |
| (7) $1.58 < N_2 < 1.68$ | 1.643 | 1.643 | 1.643 | 1.643 | 1.643 |
| (8) $1.58 < N_4 < 1.68$ | 1.636 | 1.636 | 1.643 | 1.636 | 1.636 |
| (9) $1.51 < N_5 < 1.56$ | 1.544 | 1.544 | 1.544 | 1.535 | 1.544 |
| (10) $1.51 < N_6 < 1.56$ | 1.544 | 1.544 | 1.531 | 1.535 | 1.544 |
| (11) $Y_{img}/\tan\omega > 5.5$ mm | 6.53 mm | 6.94 mm | 7.06 mm | 7.09 mm | 7.09 mm |

The imaging lens system that is a bright and large aperture lens may appropriately correct optical aberrations and exhibit superior optical performance.

Also, the imaging lens system has a configuration of an optical system appropriate for large sensors, and may be employed in electronic apparatuses, including high performance photographing apparatuses that perform out-focusing.

The imaging lens system may be applied to various kinds of electronic apparatuses along with an image sensor that converts an optical image formed by the imaging lens system into an electrical signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An imaging lens system comprising:
   a first lens that comprises a convex object-side surface and has a positive refractive power;
   a second lens that comprises a concave image plane-side surface and has a negative refractive power;
   a third lens;
   a fourth lens that comprises two spherical surfaces and has a negative refractive power;
   a fifth lens that comprises a convex image plane-side surface and has a positive refractive power; and
   a sixth lens that has a negative refractive power,
   wherein the first through sixth lenses are arranged in order from an object side to an image plane side.

2. The imaging lens system of claim 1, wherein the fifth lens has at least one spherical surface.

3. The imaging lens system of claim 1, wherein the imaging lens system satisfies the following conditions, $$20 < V1-V2 < 45, \text{ and}$$

$$20 < V1-V4 < 45,$$

wherein V1, V2, and V4 are Abbe numbers of the first lens, the second lens, and the fourth lens, respectively.

4. The imaging lens system of claim 1, wherein the imaging lens system satisfies the following condition, $$1.5 < f/EPD \leq 2.4,$$

wherein f is a focal length of the imaging lens system and EPD is an entrance pupil diameter of the imaging lens system.

5. The imaging lens system of claim 1, wherein the imaging lens system satisfies the following condition, $$0.7 < f/f1 < 1.9,$$

wherein f is a focal length of the imaging lens system and f1 is a focal length of the first lens.

6. The imaging lens system of claim 1, wherein the imaging lens system satisfies the following condition, $$0.9 < TL/f < 2.0,$$

wherein f is a focal length of the imaging lens system and TL is a distance from a vertex of the object-side surface of the first lens to the image plane.

7. The imaging lens system of claim 1, wherein the imaging lens system satisfies the following condition, $$1.0 < f/f5 < 3.0,$$

wherein f is a focal length of the imaging lens system and f5 is a focal length of the fifth lens.

8. The imaging lens system of claim 1, wherein an image plane-side surface of the sixth lens is an aspherical surface that is concave near an optical axis and has at least one inflection point.

9. The imaging lens system of claim 1, wherein the imaging lens system satisfies the following conditions, $$1.58 < N2 < 1.68,$$

$$1.58 < N4 < 1.68,$$

$$1.51 < N5 < 1.56, \text{ and}$$

$$1.51 < N6 < 1.56,$$

wherein N2, N4, N5, and N6 are refractive indexes of the second lens, the fourth lens, the fifth lens, and the sixth lens, respectively, measured at a d-line wavelength.

10. The imaging lens system of claim 1, wherein the imaging lens system satisfies the following condition, $$Yimg/\tan \omega > 5.5 \text{ mm},$$

wherein Yimg is a maximum image height on the image plane and $\omega$ is a half angle of view.

11. The imaging lens system of claim 1, wherein a stop is disposed on the object side of the first lens or between the first lens and the second lens.

12. The imaging lens system of claim 1, wherein at least one of the first lens, the second lens, the third lens, the fourth lens, the fifth lens, and the sixth lens moves along an optical axis to perform focusing.

13. The imaging lens system of claim 12, wherein the at least one of the first lens, the second lens, the third lens, the fourth lens, the fifth lens, and the sixth lens, which is relatively located on the object side, forms a focusing lens group, and when performing focusing, the focusing lens group moves along the optical axis and the remaining lenses are fixed.

14. The imaging lens system of claim 13, wherein the focusing lens group is formed of the first lens, the second lens, and the third lens.

15. The imaging lens system of claim 13, wherein the focusing lens group is formed of the first lens, the second lens, the third lens, and the fourth lens.

16. The imaging lens system of claim 1, wherein the first through sixth lenses are divided into a front group formed of at least one lens that is relatively located on the object side and a rear group formed of the remaining lenses that are relatively located on the image plane side,
   in a photographing mode, the front group and the rear group are arranged along a common optical axis, and
   in a non-photographing mode, the rear group is arranged by moving in a direction perpendicular to the optical axis, and the front group is arranged by moving toward the image plane side along the optical axis.

17. The imaging lens system of claim 16, wherein the front group is formed of the first lens, the second lens, and the third lens, and the rear group is formed of the fourth lens, the fifth lens, and the sixth lens.

18. The imaging lens system of claim 16, wherein the front group is formed of the first lens, the second lens, the third lens, and the fourth lens, and the rear group is formed of the fifth lens and the sixth lens.

19. An electronic apparatus comprising:
   the imaging lens system of claim 1; and
   an image sensor that converts an optical image formed by the imaging lens system into an electrical signal.

20. The electronic apparatus of claim 19, wherein at least one lens selected from the group consisting of the first lens, the second lens, the third lens, the fourth lens, the fifth lens, and the sixth lens moves along an optical axis to perform focusing.

21. The electronic apparatus of claim 19, wherein the first through sixth lenses of the imaging lens system are divided into a front group formed of at least one lens that is relatively located on the object side and a rear group formed of the remaining lenses that are relatively located on the image plane side, in a photographing mode, the front group and the rear group are arranged along a common optical axis, and in a non-photographing mode, the rear group is arranged by moving in a direction perpendicular to the optical axis, and the front group is arranged by moving toward the image plane side along the optical axis.

* * * * *